US011891309B2

(12) United States Patent
Prakash et al.

(10) Patent No.: US 11,891,309 B2
(45) Date of Patent: Feb. 6, 2024

(54) COOLING WATER MONITORING AND CONTROL SYSTEM

(71) Applicant: Ecolab USA Inc., Saint Paul, MN (US)

(72) Inventors: Anupam Prakash, Aurora, IL (US); Stephen J. Hinterlong, Elburn, IL (US); Hung-Ting Chen, Aurora, IL (US); Craig Myers, Lisle, IL (US); Walter H. Goodman, Lisle, IL (US); Daniel Meier, Naperville, IL (US)

(73) Assignee: Ecolab USA Inc., Saint Paul, MN (US)

( * ) Notice: Subject to any disclaimer, the term of this patent is extended or adjusted under 35 U.S.C. 154(b) by 522 days.

(21) Appl. No.: 16/130,237

(22) Filed: Sep. 13, 2018

(65) Prior Publication Data

US 2019/0084841 A1   Mar. 21, 2019

Related U.S. Application Data

(60) Provisional application No. 62/560,595, filed on Sep. 19, 2017.

(51) Int. Cl.
*F28G 9/00* (2006.01)
*C02F 1/00* (2023.01)
(Continued)

(52) U.S. Cl.
CPC ............... *C02F 1/008* (2013.01); *C02F 1/50* (2013.01); *C02F 1/66* (2013.01); *F28F 27/003* (2013.01);
(Continued)

(58) Field of Classification Search
CPC ..... F28F 27/003; F28G 15/003; G01N 17/008
(Continued)

(56) References Cited

U.S. PATENT DOCUMENTS 4,044,605 A   8/1977 Bratthall
4,339,945 A   7/1982 Knudsen et al.
(Continued)

FOREIGN PATENT DOCUMENTS

AU   2001272969 B9   12/2006
CN   1731068 A   2/2006
(Continued)

OTHER PUBLICATIONS

Gudmundsson et al., "Method to Detect Fouling in Heat Exchangers," The 11th symposium on District Heating and Cooling, Reykjavik, Iceland ("Gudmundsson"), Aug. 31 to Sep. 2, 2008, Reykjavik, Iceland, published in 2008.
(Continued)

*Primary Examiner* — Davis D Hwu
(74) *Attorney, Agent, or Firm* — Fredrikson & Bryon, P.A.

(57) ABSTRACT

A method of controlling cooling water treatment at a cooling tower may involve measuring operating data of one or more downstream heat exchangers that receive cooling water from the cooling tower. For example, the inlet and outlet temperatures of both the hot and cold streams of a downstream heat exchanger may be measured, optionally along with a flow rate of the cooling water stream passing through the heat exchanger. Data from the streams passing through the heat exchanger may be used to determine a heat transfer efficiency for the heat exchanger. The heat transfer efficiency can be trended over a period of time and changes in the trend detected to identify cooling water fouling issues. A chemical additive selected to reduce, eliminate, or otherwise control the cooling water fouling can be controlled based on the changes in heat transfer efficiency detected at the downstream heat exchanger.

19 Claims, 17 Drawing Sheets

(51) Int. Cl.
  *F28F 27/00* (2006.01)
  *C02F 1/50* (2023.01)
  *C02F 1/66* (2023.01)
  *F28G 15/00* (2006.01)
  *G01N 17/00* (2006.01)
  *C02F 103/02* (2006.01)

(52) U.S. Cl.
  CPC ......... *F28G 15/003* (2013.01); *G01N 17/008* (2013.01); *C02F 2103/023* (2013.01); *C02F 2209/02* (2013.01); *C02F 2209/40* (2013.01); *C02F 2303/08* (2013.01); *C02F 2303/20* (2013.01); *C02F 2303/22* (2013.01); *F28F 2200/00* (2013.01)

(58) Field of Classification Search
  USPC ................................................. 165/11.1, 95
  See application file for complete search history.

(56) References Cited

U.S. PATENT DOCUMENTS

| | | | |
|---|---|---|---|
| 4,383,438 | A | 5/1983 | Eaton |
| 5,085,831 | A | 2/1992 | Hickey et al. |
| 5,126,729 | A | 6/1992 | Mckinney et al. |
| 5,171,450 | A | 12/1992 | Hoots |
| 5,190,095 | A * | 3/1993 | Fujimoto ............... F28G 1/125 165/95 |
| 5,273,687 | A | 12/1993 | Osborne |
| 5,278,074 | A | 1/1994 | Rao et al. |
| 5,353,653 | A | 10/1994 | Watanabe et al. |
| 5,429,178 | A | 7/1995 | Garey et al. |
| 5,590,706 | A * | 1/1997 | Tsou ....................... F28F 19/00 165/95 |
| 5,603,840 | A | 2/1997 | Strittmatter et al. |
| 5,734,098 | A | 3/1998 | Kraus et al. |
| 6,454,995 | B1 | 9/2002 | Tong |
| 6,739,290 | B2 | 5/2004 | Iwasaki et al. |
| 6,740,231 | B1 | 5/2004 | Bauman et al. |
| 7,110,906 | B2 | 9/2006 | Vesel |
| 7,146,231 | B2 | 12/2006 | Schleiss et al. |
| 7,594,430 | B2 | 9/2009 | Beardwood et al. |
| 7,726,874 | B2 | 6/2010 | Kirchberg |
| 7,827,006 | B2 * | 11/2010 | Miller .................. G05B 23/024 702/183 |
| 8,069,003 | B2 | 11/2011 | Friedrich et al. |
| 8,444,118 | B1 | 5/2013 | Dumler et al. |
| 8,489,240 | B2 | 7/2013 | Wan et al. |
| 8,762,106 | B2 | 6/2014 | Miller |
| 9,364,879 | B2 | 6/2016 | Shimoi et al. |
| 9,689,790 | B2 | 6/2017 | Patankar et al. |
| 9,841,184 | B2 | 12/2017 | Kreider et al. |
| 2002/0105346 | A1 | 8/2002 | Banks |
| 2002/0174678 | A1 | 11/2002 | Wilding et al. |
| 2004/0254682 | A1 | 12/2004 | Kast |
| 2005/0034467 | A1 | 2/2005 | Varney |
| 2005/0133211 | A1 | 6/2005 | Osborn et al. |
| 2006/0037399 | A1 | 2/2006 | Brown |
| 2008/0082304 | A1 | 4/2008 | Miller |
| 2008/0084565 | A1 | 4/2008 | Zribi et al. |
| 2009/0090613 | A1 | 4/2009 | Cody et al. |
| 2009/0188645 | A1 | 7/2009 | Harpster et al. |
| 2010/0020844 | A1 | 1/2010 | Ashe |
| 2010/0163469 | A1 | 7/2010 | Wan et al. |
| 2012/0018907 | A1 | 1/2012 | Dumler et al. |
| 2012/0330474 | A1 | 12/2012 | Kreider et al. |
| 2013/0105406 | A1 | 5/2013 | Van Der Wal et al. |
| 2014/0008035 | A1 | 1/2014 | Patankar et al. |
| 2014/0131283 | A1 | 5/2014 | Relenyi et al. |
| 2014/0254682 | A1 | 9/2014 | Ying et al. |
| 2014/0260358 | A1 | 9/2014 | Leete et al. |
| 2015/0003495 | A1 | 1/2015 | Aspinall |
| 2016/0169825 | A1 | 6/2016 | Lehikoinen |
| 2016/0305865 | A1 | 10/2016 | Silva et al. |
| 2018/0149588 | A1 | 5/2018 | Fortunato et al. |
| 2019/0145722 | A1 | 5/2019 | Myers et al. |

FOREIGN PATENT DOCUMENTS

| | | | |
|---|---|---|---|
| CN | 1873362 | A | 12/2006 |
| CN | 101655477 | A | 2/2010 |
| CN | 102026921 | A | 4/2011 |
| CN | 103629959 | A | 3/2014 |
| CN | 104267072 | A | 1/2015 |
| CN | 104483448 | A | 4/2015 |
| CN | 104502532 | A | 4/2015 |
| CN | 104819993 | A | 8/2015 |
| CN | 105158293 | A | 12/2015 |
| CN | 105445319 | A | 3/2016 |
| CN | 105758879 | A | 7/2016 |
| CN | 205538771 | U | 8/2016 |
| CN | 106017965 | A | 10/2016 |
| CN | 205748090 | U | 11/2016 |
| CN | 106288940 | A | 1/2017 |
| CN | 106872514 | A | 6/2017 |
| CN | 106932214 | A | 7/2017 |
| CN | 106989908 | A | 7/2017 |
| CN | 107091590 | A | 8/2017 |
| CN | 206648815 | U | 11/2017 |
| EP | 155826 | A2 | 9/1985 |
| EP | 1980535 | A2 | 10/2008 |
| EP | 2307932 | A1 | 4/2011 |
| FR | 2910546 | A1 | 6/2008 |
| GB | 770242 | A | 3/1957 |
| JP | S5915800 | A | 1/1984 |
| JP | H02161293 | A | 6/1990 |
| JP | H06330747 | A | 11/1994 |
| JP | 2000028557 | A | 1/2000 |
| JP | 2005300404 | A | 10/2005 |
| JP | 2013015259 | A | 1/2013 |
| JP | 2015080780 | A | 4/2015 |
| KR | 100652249 | B1 | 12/2006 |
| WO | 9911578 | A1 | 3/1999 |
| WO | 2007137382 | A2 | 12/2007 |
| WO | 2011022210 | A2 | 2/2011 |
| WO | 2011106712 | A2 | 9/2011 |
| WO | WO-2011106712 | A2 * | 9/2011 ............ F22B 37/003 |

OTHER PUBLICATIONS

Prasad et al., "Predictive Heat Exchanger Efficiency Monitoring," Proceedings of HT2005 2005 ASME Summer Heat Transfer Conference, Jul. 17-22, 2005, San Francisco, California, USA ("Prasad"), published in 2005.

U.S. Appl. No. 16/185,817, Third-Party Submission Under 37 CFR 1.290 filed Aug. 12, 2020, 32 pages.

"3D Trasar Helps Ammonia Plant Maintain Clean Heat Exchangers During Longer Production Runs," Nalco Company, Case Study CH-734, 2007, 4 pages.

Barker et al., "Light oil catalytic processing. Reforming. Process," National Petrochemical and Refiners Association—Question and Answer Session on Refining and Petrochemical Technology, Transcripts (2000), vol. 1990-1999, 12 pages, Abstract Only.

Chaffee et al., "Reducing energy costs . . . [A summary of field experiences in managing heat recovery systems using different monitoring means and the use of antifoulants to minimise refinery fouling related energy costs]," International Journal of Hydrocarbon Engineering (Dec. 1998), vol. 4, No. 1, pp. 55, Abstract Only.

Chattoraj et al., "On-line measurement and control of microbiological activity in industrial water systems," NACE International, Corrosion 2001, 9 pages, Abstract Only.

Chen et al., "Corrosion and Corrosion Product Transport Monitoring in Boiler Condensate Systems," NACE International, Paper No. 336, 1994, 18 pages, Abstract Only.

"Coil Flo: Air Cooler Performance Cleaning," Nalco Company, Bulletin B-733, 2006, 2 pages.

De Oliveira Filho et al., "A matrix approach for steady-state simulation of heat exchanger networks," Applied Thermal Engineering, vol. 27, No. 14-15, Oct. 2007, pp. 2385-2393, Abstract Only.

Enzien et al., "On-line performance monitoring of treatment programs for MIC control," NACE International, Corrosion 2001, 13 pages, Abstract Only.

(56) References Cited

OTHER PUBLICATIONS

Hale et al., "Corrosion control in cooling water systems: recent experience using a new corrosion monitor," International Conference on Corrosion in Refinery Petrochemical and Power Generation Plants; Venezia; Italy; May 18-19, 2000. pp. 367-376, Abstract Only.
Hatch et al., "Real world experiences with a new cooling water automation system," NACE International, Corrosion 2003, 22 pages, Abstract Only.
Herrmann et al., "On-line data monitoring improves antifoulant performance," NPRA 1991 Annual Meeting, Mar. 1991, 14 pages, Abstract Only.
Hoots et al., "Latest methods of performance optimization and control in cooling water," NACE International, Corrosion 2001, 25 pages, Abstract Only.
Hoots et al., "New methods for on-line monitoring/control of corrosion inhibitors and performance relationships," 8th European Symposium on Corrosion Inhibitors. vol. 1; Ferrara; Italy; Sep. 18-22, 1995. pp. 533-542, Abstract Only.
Hoots, "Tagged polymer technology for improved cooling system monitoring and Control," NACE, Corrosion 1993, 7 pages, Abstract Only.
Hoots et al., "The use of fluorescent tracer significantly improves west coast refinery's control of cooling water treatment," NACE, Corrosion 1991, 11 pages, Abstract Only.
Hoots et al., "Use of fluorescent tracer significantly improves control of cooling water treatment," Materials Performance (1992), vol. 31, No. 2, pp. 46-51, Abstract Only.
International Patent Application No. PCT/US2018/050841, International Search Report and Written Opinion dated Dec. 14, 2018, 14 pages.
Licina, "Monitoring system fouling with a model heat exchanger and an electrochemical biofilm activity probe," Proceedings of the American Power Conference, vol. 60, No. 2, 1998, pp. 965-968, Abstract Only.
"Maximising Heat Exchange Efficiency: Another Solution from the Industry Leader," Nalco Company, Brochure E-235E, 2004, 2 pages.
Mazur et al., "Innovative technology uniting new chemicals with advanced monitoring and control optimizes the performance of cooling water systems in metal production processes," Light Metals 2005—Proceedings of the Technical Sessions Presented by the TMS Aluminium Committee, pp. 995-1000, Abstract Only.
Moriarty et al., "Methods to monitor and control scale in cooling water systems," NACE International, Corrosion 2001, 26 pages, Abstract Only.
Moriarty et al., "Monitoring polymeric treatment programs in alkaline cooling water," NACE, Corrosion 1989, Paper No. 156, 14 pages, Abstract Only.
Ohtsu et al., "Application of analysis and control for corrosion damage in cooling water systems using corrosion monitoring," NACE International Corrosion Conference, Mar. 22-26, 2009, 14 pages, Abstract Only.
Roberts et al., "On-line, real-time expert system for cooling water," Proc.—Int. Water Conf., Eng. Soc. West. Pa. 49th 123-34 (1988), pp. 123, Abstract Only.
Schreier et al., "Heat exchanger fouling: A model study of the scaleup of laboratory data," Chemical Engineering Science, vol. 50, No. 8, Apr. 1995, pp. 1311-1321, Abstract Only.
Shen et al., "Petrochemical processing. Ethylene," National Petrochemical and Refiners Association—Question and Answer Session on Refining and Petrochemical Technology, Transcripts (2000), vol. 1990-1999, 5 pages, Abstract Only.
Sotoudeh et al., "On-line cleaning of year-round building HVAC loops," Corrosion 1999, 20 pages, Abstract Only.
Stuart et al., "Practical experience with advanced on-line monitoring techniques," Materials Performance (1990), vol. 29, No. 11, pp. 63-69, Abstract Only.
Wetegrove et al., "Optical monitor for improved fouling control in cooling systems," Journal of the Cooling Tower Institute (1997), vol. 18, No. 1, pp. 52-56, Abstract Only.
Winters et al., "Real-time performance monitoring of fouling and under-deposit corrosion in cooling water systems," Corrosion Science, vol. 35, No. 5-8, 1993, pp. 1667-1675, Abstract Only.
Winters et al., "Simultaneous Corrosion and Fouling Monitoring Under Heat Transfer in Cooling Water Systems," ASTM Specal Technical Publication, Electrochemical Noise Measurement for Corrosion Applications, No. 1277, 1996, pp. 230-246, Abstract Only.
Yamashita, "Model-based monitoring of fouling in a heat exchanger," 6th International Symposium on Advanced Control of Industrial Processes (AdCONIP), Taipei, Taiwan, May 28-31, 2017, pp. 453-456.
Yang, "A Novel Method for On-Line Determination of Underdeposit Corrosion Rates in Cooling Water Systems," NACE International, Paper No. 335, 1994, pp. 26, Abstract Only.
Yang, "A Novel Method for On-Line Determination of Underdeposit Corrosion Rates in Cooling Water Systems," NACE, Corrosion, 1994, No. 335, pp. 27, Abstract Only.
Yang, "Advances in localized corrosion control in cooling water systems," 9th European Symposium on Corrosion Inhibitors. vol. 2; Ferrara; Italy; Sep. 4-8, 2000. pp. 821-834, Abstract Only.
Yang, "Localized corrosion monitoring in cooling water systems," NACE, Corrosion 1995, 23 pages, Abstract Only.
Yang, "Minimizing localized corrosion via new chemical treatments and performance based treatment optimization and control," Corrosion 1999, 27 pages, Abstract Only.
Yang, "Real-Time Localized Corrosion Monitoring in Industrial Cooling Water Systems," Corrosion, vol. 56, No. 7, Jul. 2000, pp. 743-756, Abstract Only.
Yang, "Real-Time Localized Corrosion Monitoring in Industrial Cooling Water Systems," Corrosion Reviews, vol. 19, No. 3-4, 2001, pp. 315-346, Abstract Only.
Yang, "Real time localized corrosion monitoring [(LCM)] in refinery cooling water systems," NACE, Corrosion 1998, Paper No. 595, 27 pages, Abstract Only.
Yu et al., "Unique chemistry and control technology merge to improve cooling water performance and control," NACE Meeting Papers, Corrosion 2004, 11 pages, Abstract Only.
Sun et al., "Research on the method of plate heat exchanger fouling judgement," Applied Energy Technology, No. 5, 2015, pp. 36-39, including English Abstract.
"Heat Exchanger Theory and the Heat Exchanger Design Equation," Bright Hub Engineering, Retrieved online from https://www.brighthubengineering.com/hvac/59900-fundamentals-of-heat-exchanger-theory-and-design/, Dec. 22, 2009, 9 pages.

* cited by examiner

COOLING WATER MONITORING AND CONTROL SYSTEM

CROSS-REFERENCE

This application claims priority to U.S. Provisional Patent Application No. 62/560,595, filed Sep. 19, 2017, the entire contents of which are incorporated herein by reference.

TECHNICAL FIELD

This disclosure relates to cooling water systems and, more particularly, to cooling water control systems.

BACKGROUND

Water cooling towers are used in large capacity heat exchange systems, such as those found in oil refineries and chemical production plants. Cooling towers are used to remove absorbed heat from a circulating water coolant by evaporating a portion of the coolant in the cooling tower. The remaining coolant can be extracted from a reservoir or sump at the base of the tower by a pump, and supplied through the heat load on a continuous basis. Because a large quantity of water evaporates in such a system, scale, sludge, or other water contaminants may build up in the recirculating water over time.

To help prevent or limit the extent to which fouling occurs on surfaces contacted by the recirculating cooling water, various chemicals may be added to the cooling water. The chemicals may inhibit the precipitation of minerals out of the water, which otherwise can form scaling on the surfaces contacted by the water. Additionally or alternatively, the chemicals may inhibit biofouling sources and/or the deposition of corrosion products on the surfaces contacted by the water.

In a typical operating environment, a technician may take samples of cooling water from the cooling water system and perform chemical analysis on the samples. The technician may adjust the type of chemical added to the cooling water based on the analysis. Oftentimes, the technician may only be onsite at the facility to perform cooling water analysis on a limited basis, such as once a month or once a quarter. As a result, changes in facility process conditions may not be detected until some time after the process conditions have altered. Moreover, even where cooling water chemistry is changed to account for changed process conditions, such charges are generally reactionary rather than predictive changes to prevent undesirable cooling water conditions.

SUMMARY

In general, this disclosure is directed to techniques and systems for monitoring and controlling cooling water. In some examples, the conditions of the cooling water in the cooling water circuit are monitored and/or controlled indirectly by evaluating the thermal performance of one or more downstream heat transfer units through which the cooling water is conveyed. For example, a heat exchange network may include one or more cooling towers that are fluidly connected to and supply cooling water to multiple heat exchanges. The cooling water may pass through one side of each heat exchanger while a process fluid to-be-cooled passed through an opposite side of the heat exchanger, either in a co-current or counter-current direction.

In some examples, the thermal performance of one or more of the heat exchangers in the heat exchange network are monitored by monitoring the inlet and outlet temperatures of both the process stream and cooling water stream passing through the heat exchanger. Other process parameters, such as the flow rate of the cooling water stream and/or process stream, may also be monitored. In either case, a parameter corresponding to the heat transfer efficiency of the heat exchanger may be determined based, at least in part, on the temperature data. A trend of the heat transfer efficiency of the heat exchanger may be established to provide a reference from which future deviations from the trend can be determined. The heat transfer efficiency of the heat exchanger can be subsequently monitored and changes in the heat transfer efficiency detected. Chemical additives introduced into the cooling water stream can be controlled based on changes detected in the heat transfer efficiency trend for the heat exchanger. As a result, unexpected changes in the heat transfer efficiency of the heat exchanger caused by cooling water conditions can be detected early and may be mitigated through control of chemical additives rather than waiting until conditions have fully deteriorate to the point that heat exchanger performance is materially limited.

In practice, the heat transfer efficiency of the heat exchanger may vary based on a variety of factors that impact the efficiency with which thermal energy can transfer from the comparatively hot process stream to the comparatively cool cooling water stream. For example, fouling deposited on the surfaces of the heat exchanger contacted by the process steam can reduce thermal transfer to the cooling water stream. Likewise, fouling deposited on the surfaces of the heat exchanger contacted by the cooling water stream can also reduce the thermal transfer to the cooling water stream.

In many process environments, the process steam is a more fouling prone stream than the cooling water stream. As a result, fouling build-up on the process stream side of the heat exchanger may be significantly greater than on the cooling water stream side of the heat exchanger. For example, depending on operating conditions, fouling build-up on the process side of the heat exchanger may cause 75% or more of thermal efficiency performance degradation of the heat exchanger compared to when the heat exchanger is clean (e.g., free of fouling on the process side and/or cooling water side). For example, fouling build-up on the process side of the heat exchanger may cause 95% or more of thermal efficiency performance degradation of the heat exchanger.

Notwithstanding the dominant impact that process-side fouling can have on heat exchanger thermal efficiency, it has been found that, in some applications, heat exchanger thermal efficiency can still provide actionable insights into cooling water-side fouling conditions. For example, changes in heat exchanger thermal efficiency trends (e.g., when there have not been significant changes in the composition, temperature, and/or flow rates of the process stream passing through the heat exchanger) can be attributable fouling conditions on the cooling water side of the heat exchanger. Chemical additive introduced into the cooling water upstream of the heat exchanger can be controlled based on a change in heat exchanger thermal efficiency detected downstream. In some applications, real-time monitoring and control are provided to facilitate rapid response to unexpectedly deteriorating heat exchanger thermal efficiency conditions. This rapid intervention may extend the service life of the heat exchanger until the next physical cleaning in a way that is not achievable if heat exchanger becomes fully fouled before detecting the fouled conditions.

In one example, a method of controlling cooling water treatment is described. The method includes receiving data from a plurality of sensors indicative of at least a temperature of a cooling water stream entering a heat exchanger, a temperature of the cooling water stream exiting the heat exchanger, a temperature of a process stream entering the heat exchanger, and a temperature of the process stream exiting the heat exchanger. The method also involves determining a heat transfer efficiency for the heat exchanger based on the received data from the plurality of sensors and establishing a heat transfer efficiency trend for the heat exchanger over a period of time. The method further involves detecting a change in the heat transfer efficiency trend and controlling addition of a chemical additive into the cooling water stream in response to the change detected in the heat transfer efficiency trend for the heat exchanger.

In another example, a system is described that includes a cooling tower, a heat exchanger, a plurality of sensors, a pump, and a controller. The cooling tower reduces a temperature of a cooling water stream through evaporative cooling. The heat exchanger has a cooling water inlet, a cooling water outlet, a process stream inlet, and a process stream outlet. The plurality of sensors are positioned to measure a temperature of a cooling water stream entering the heat exchanger through the cooling water inlet, a temperature of the cooling water stream exiting the heat exchanger through the cooling water outlet, a temperature of a process stream entering the heat exchanger through the process stream inlet, and a temperature of the process stream exiting the heat exchanger through the process stream outlet. The pump is positioned upstream of the heat exchanger and configured to inject a chemical additive into the cooling water stream. The controller is communicatively coupled to the plurality of sensors and the pump and configured to: receive data from the plurality of sensors, determine a heat transfer efficiency for the heat exchanger based on the received data from the plurality of sensors, establish a heat transfer efficiency trend for the heat exchanger over a period of time, detect a change in the heat transfer efficiency trend, and control the pump in response to the change detected in the heat transfer efficiency trend for the heat exchanger.

The details of one or more examples are set forth in the accompanying drawings and the description below. Other features, objects, and advantages will be apparent from the description and drawings, and from the claims.

DETAILED DESCRIPTION

This disclosure is generally directed to cooling water monitoring and control systems, including systems and techniques for controlling the addition of one or more chemical agents to a cooling water source used for thermal exchange with one or more comparatively hot streams. The one or more chemical agents added to the cooling water may prevent or minimize the extent to which fouling deposits on heat exchange surfaces in fluid contact with the cooling water. This can improve the efficiency of the facility in which the heat exchange network with controlled cooling water chemical addition is implemented.

Figure 1:
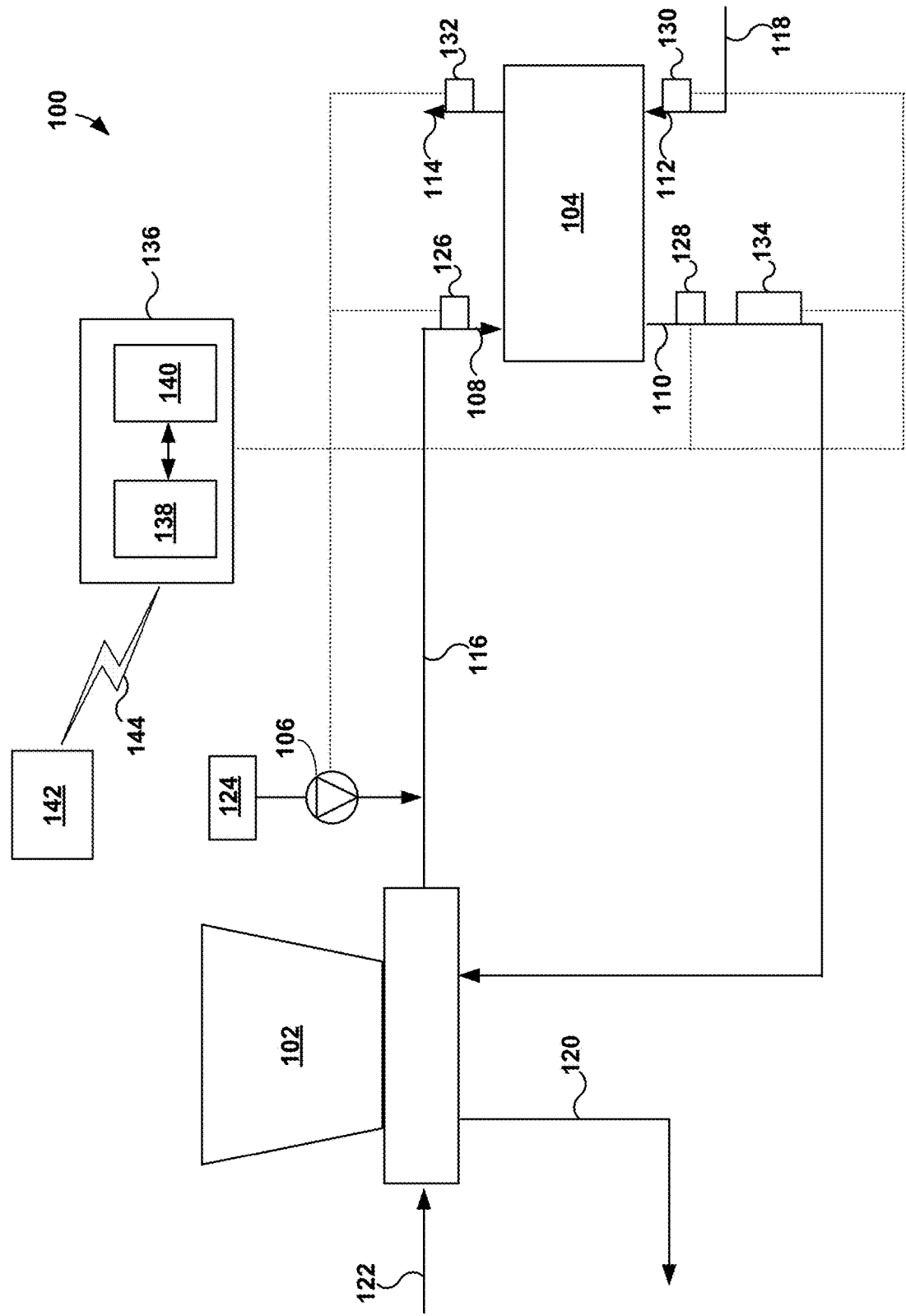
FIG. 1 is a conceptual diagram of an example cooling water monitoring and control system.

FIG. 1 is a conceptual diagram of an example cooling water monitoring and control system 100. System 100 includes a cooling tower 102, one or more heat exchanges 104, and a pump 106 that can introduce one or more chemical agents into a cooling water stream being recirculated through the heat exchange network. In operation, a comparatively hot process stream and a comparatively cold cooling water stream can be passed through heat exchanger 104. The fluids may be separated by a solid wall surface within the heat exchanger to prevent mixing of the fluids. Thermal energy can transfer from the comparatively hot process stream to the comparatively cold cooling water stream, resulting in a reduction in the temperature of the process stream and an increase in the temperature of the cooling water stream. While the example system of FIG. 1 includes only a single heat exchanger 104 for purposes of illustration, a heat exchange network utilizing the concepts of the present disclosure may include multiple heat exchangers (e.g., each configured as heat exchanger 104 is described) that a cooling water stream flows through in series or in parallel.

Heat exchanger 104 in the example of FIG. 1 includes a cooling water inlet 108 and a cooling water outlet 110. The heat exchanger also includes a process stream inlet 112 and process stream outlet 114. A cooling water stream 116 can enter heat exchanger 104 through the cooling water inlet 108, flow through one or more divided pathways inside of the heat exchanger, and exit the heat exchanger through the cooling water outlet 110. Likewise, a process stream 118 can enter heat exchanger 104 through the process stream inlet 112, flow through one or more divided pathways inside of the heat exchanger that are separated from the cooling water stream, and exit the heat exchanger through process stream outlet 114. In some configurations, the cooling water stream and the process stream flow in a co-current directions through the heat exchanger. In other configurations, the cooling water stream in the process stream flow in counter-current directions through the heat exchanger. In general, heat exchanger 104 can be implemented using any desired type of heat exchanger design, such as a shell and tube heat exchanger, a plate heat exchanger, or other type of thermal transfer device.

In the illustrated configuration, cooling water stream 116 is delivered to heat exchanger 104 from an upstream cooling tower 102 and recycled back to the cooling tower after passing through the heat exchanger. As indicated above, cooling water stream 116 may pass through one or more heat exchangers before entering heat exchanger 104 and/or through one or more heat exchangers after passing through heat exchanger 104 before returning to cooling tower 102. At cooling tower 102, thermal energy transferred to the cooling water stream flowing through the heat transfer circuit can be removed and discharged to atmosphere. For example, cooling tower 102 may bring the cooling water stream in direct contact with air, resulting in a reduction in the temperature the cooling water stream through evaporative cooling. The cooling water may be delivered to a sump or reservoir before being drawn out and passed through the heat exchange network.

In addition to water loss through evaporation, cooling water may be periodically removed from the heat exchange system. A discharge line 120 can be used to "bleed-off" a portion of the sump or reservoir water while the system is operating, or a "blow down" can be performed, which is typically a complete draining of the sump. In any case, a "make-up" water line 122 can supply fresh water to the cooling system to make for water losses through evaporation or deliberate dumping.

In practice, a variety of issues may impact the thermal performance of heat exchanger 104 from the cooling water side of the heat exchanger. For example, if the cooling water contains a high level of solids (e.g., silt, debris) the solids may partially or fully plug the cooling water fluid pathway through heat exchanger 104. As an example, the cooling water may cause deposits to form on the internal surfaces of heat exchanger 104 contacted by the cooling water.

For example, the evaporation of cooling water can lead to the concentration of salts (e.g., calcium, sodium, magnesium) in the cooling water stream recycled through the system. These salts can form scaling deposits on surfaces of heat exchanger 104 contacted by the cooling water. As another example, if the cooling water contains organic materials and microbes, biofilms can deposit on surfaces of heat exchanger 104 contacted by the cooling water. As yet a further example, corrosion products can develop within the cooling water stream, e.g., due to the oxidation of metal component (e.g., iron, aluminum, and/or zinc). These corrosion products can also deposit on surfaces of heat exchanger 104 contacted by the cooling water. Independent of the mechanism or cause of the fouling, a build-up of a barrier layer on the surfaces of heat exchanger 104 contacted by the cooling water can reduce the efficacy of thermal transfer through the heat exchanger.

To help reduce or eliminate potential fouling conditions in the cooling water stream passing through the heat transfer network, one or more chemicals may be added to the cooling water to inhibit formation and/or deposition of foulants. In the configuration of FIG. 1, system 100 includes a pump 106 fluidly connected to a chemical additive reservoir 124. Pump 106 can operate to add one or more chemicals to the cooling water that are selected to inhibit the formation and/or deposition of foulants on surfaces contacted by the cooling water. Example chemical additives that may be injected into the cooling water include, but are not limited to, a polymer (scale inhibitor), an organophosphorus compound such as zinc polyphosphate, zinc orthophosphate, and/or zinc organo-phosphorous compound (scale and corrosion inhibitors), and a biocide. Additionally or alternatively, one or more chemical additives may be injected into the cooling water to adjust the pH of the cooling water. Examples of pH adjusting compounds include mineral acids, organic acids, and inorganic bases.

In the illustrated configuration of FIG. 1, pump 106 is illustrated as adding chemical additive to the cooling water between cooling tower 102 and heat exchanger 104. In practice, the chemical additive may be introduced to the cooling water stream at any suitable location, such as a sump associated with the cooling tower. Moreover, while system 100 in FIG. 1 illustrates a single pump 106 fluidly coupled to a single chemical additive reservoir 124, pump 106 may be in selective fluid communication with multiple reservoirs containing different chemicals and/or system 100 may include multiple pumps each configured to introduce a different chemical into the cooling water. By providing multiple different chemical additives, include some or all of those discussed above, the type of chemical introduced into the cooling water can be changed based on changing conditions of the cooling water.

To control the addition of chemical additive into the cooling water in system 100, the thermal performance of heat exchanger 104 may be monitored. The thermal performances of heat exchanger 104 may be monitored to evaluate the efficiency with which thermal energy is transferring from the comparatively hot process stream to the comparatively cold cooling water stream. The heat transfer efficiency of heat exchanger 104 may greatest when the heat exchanger is initially cleaned. For example heat exchanger 104 may be periodically cleaned using chemical and/or mechanical cleaning implements to remove fouling on the process and/or cooling side of the exchanger, providing heat exchange surfaces of the heat exchanger are clean and substantially or entirely unfouled. Over time in service, fouling deposits may build up on the process stream side and/or cooling water stream side of the heat exchanger heat transfer surfaces. As a result, the heat transfer efficiency of heat exchanger 104 may deteriorate during the course of service from one cleaning to the next cleaning.

To help monitor the heat transfer efficiency of heat exchanger 104, multiple sensors may be deployed to monitor different operational aspects of the heat exchanger. In the example of FIG. 1, system 100 includes a temperature sensor 126 that measures a temperature of cooling water stream 116 and 3 heat exchanger 104 and a temperature sensor 128 measuring a temperature of the cooling water stream exiting the heat exchanger. The system also includes a temperature sensor 130 measuring the temperature of the process stream 118 entering heat exchanger 104, and a temperature sensor 132 measuring the temperature the process stream exiting the heat exchanger. While the temperature sensors are illustrated schematically as being positioned immediately adjacent heat exchanger 104, the temperature sensors may be positioned at an upstream or downstream location from the heat exchanger, provided the temperature sensors provide a suitably accurate measure of the temperature of the respective stream entering or exiting the heat exchanger.

System 100 may include additional and/or different sensors to measure different operational parameters of heat exchanger 104. For example, the system may include one or more flow sensors to measure the flow rate of cooling water stream 116 and/or process stream 118. In the illustrated example, system 100 shows a flow sensor 134 positioned to measure a flow rate of the cooling water stream exiting heat exchanger 104. In other examples, the flow rates of the cooling water stream 116 and/or process stream 118 may be determined based on pump speeds or other information within the operating environment indicating the amount of fluid conveyed through the heat exchanger. Other sensors that may be usefully employed in system 100 include pressure sensors (e.g., to measure a differential pressure of the cooling water stream and/or process stream across the heat exchanger), an oxidation-reduction potential (ORP) sensor to measure the ORP of the cooling water, a pH sensor to measure the pH of the cooling water, and/or a conductive sensor to measure the conductivity of the cooling water.

System 100 in the example of FIG. 1 also includes controller 136. Controller 136 can be communicatively connected to the sensor components and controllable components of system 100 to manage the overall operation of the system. For example, controller 136 can be communicatively connected to pump 106, cooling water inlet temperature sensor 126, cooling water outlet temperature sensor 128, process stream inlet temperature sensor 130, process stream outlet temperature sensor 132, and flow sensor 134.

Controller 136 includes processor 138 and memory 140. Controller 136 communicates with communicatively connected components via a wired or wireless connection, which in the example of FIG. 1 is illustrated as a wired connection. Controls signals sent from controller 136 and received by the controller can travel over the connection. Memory 140 stores software for running controller 136 and may also store data generated or received by processor 138, e.g., from temperature sensors 126, 128, 130, 132, and flow sensor 134. Processor 138 runs software stored in memory 140 to manage the operation of system 100.

Controller 136 may be implemented using one or more controllers, which may be located at the facility site containing heat exchanger 104. Controller 136 may communicate with one or more remote computing devices 142 via a network 144. For example, controller 136 may communicate with a geographically distributed cloud computing network, which may perform any or all of the functions attributed to controller 136 in this disclosure.

Network 144 can be configured to couple one computing device to another computing device to enable the devices to communicate together. Network 144 may be enabled to employ any form of computer readable media for communicating information from one electronic device to another. Also, network 144 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. Communication links within LANs may include twisted wire pair or coaxial cable, while communication links between networks may utilize analog telephone lines, full or fractional dedicated digital lines, Integrated Services Digital Networks (ISDNs), Digital Subscriber Lines (DSLs), wireless links including cellular and satellite links, or other communications links. Furthermore, remote computers and other related electronic devices may be remotely connected to either LANs or WANs via a modem and temporary telephone link.

In operation, temperature sensors 126, 128, 130, and 132 can generate data indicative of a temperature of a respective fluid stream entering or exiting heat exchanger 104. Likewise, flow sensor 134 can generate data indicative of a flow rate of cooling water exiting heat exchanger 104. Controller 136 can receive data from the sensors deployed throughout system 100 and use data generated by the sensors to determine a heat transfer efficiency of heat exchanger 104. With reference to information stored in memory relating received temperature information and/or flow rate information to heat transfer efficiency values, controller 136 can determine heat transfer efficiency values for the heat exchanger.

In some examples, controller 136 can determine the heat transfer efficiency of heat exchanger 104 using Equation (1) below:

$$U\text{-Value:} \frac{\dot{m} C_p \Delta T_{water}}{\Delta T_{LMTD} \times \text{Heat } Tr \cdot \text{Area} \times F_t} \quad \text{Equation 1}$$

In Equation (1) above, U-Value is the heat transfer efficiency, m is the mass of the cooling water stream per unit time, $C_p$ is the specific heat of the cooling water stream, $\Delta T_{water}$ is a difference between the temperature of the cooling water stream exiting the heat exchanger and the temperature of the cooling water stream entering a heat exchanger, Heat Tr. Area is an amount of surface area of the heat exchanger over which thermal energy is transferred between the process stream and the cooling water stream, $F_t$ is a correction factor corresponding to a geometry of the heat exchange and $\Delta T_{LMTD}$ is a log-mean temperature difference. Parameters such as the specific heat of the cooling water stream, the heat transfer area of heat exchanger 104, and a correction factor, may be stored in a memory and/or calculable based on information stored in memory. For example, a user may use a user input device to store information in memory 140 of controller 136 corresponding to the specific heat of the cooling water stream (e.g., the specific heat of water), and characteristics corresponding to the geometry of heat exchanger 104.

The log-mean temperature difference in Equation (1) above may be calculated using Equation (2) or (3) below.

$$\Delta T_{LMTD} = \frac{(T_{process,in} - t_{water,out}) - (T_{process,out} - t_{water,in})}{\log_e \frac{T_{process,in} - t_{water,out}}{T_{process,out} - t_{water,in}}} \quad \text{Equation 2}$$

$$\Delta T_{LMTD} = \frac{(T_{process,in} - t_{water,in}) - (T_{process,out} - t_{water,out})}{\log_e \frac{T_{process,in} - t_{water,in}}{T_{process,out} - t_{water,out}}} \quad \text{Equation 3}$$

Equation (2) may be used in circumstances where the cooling water stream and the process stream flow in a counter-current direction. Equation (3) may be used in circumstances where the cooling water stream and the process stream flow in a co-current direction. In both Equations (2) and (3), $T_{Process,in}$ is the temperature of the process water stream entering the heat exchanger as measured by temperature sensor 130, $T_{Process,out}$ is the temperature of the process stream exiting the heat exchanger as measured by temperature sensor 132, $t_{water,in}$ is the temperature of the cooling water stream entering the heat exchanger as measured by temperature sensor 126, and $t_{water,out}$ is the temperature of the cooling water stream exiting the heat exchanger, as measured by temperature sensor 128.

Controller 136 may receive data from the sensors in system 100 and determine the heat transfer efficiency of heat exchanger 104 continuously or on a periodic basis. For example, controller 136 may determine the heat transfer efficiency of heat exchanger 104 at least once per day, such as at least once per hour, at least once per minute, or at least once per second. The frequency with which controller 136 calculates the heat transfer efficiency of heat exchanger 104 may vary depending on the sampling rate of the sensors in system 100, the processing capacity of controller 136, and/or an operator input selecting the frequency with which the heat transfer efficiency should be calculated.

In practice, it is desirable if heat exchanger 104 exhibits a high heat transfer efficiency that remains high (e.g., substantially constant) during the service interval of the heat exchanger. In practice, however, the heat transfer efficiency of heat exchanger 104 may decrease over time as fouling builds up on the process stream side of the heat exchanger and/or on the cooling water side of the heat exchanger. By monitoring the rate at which fouling builds up on the heat exchanger and the corresponding rate at which the thermal efficiency changes for the heat exchanger, interventional action may be taken on the cooling water side by controlling pump 106 to control the addition of one or more chemical additives to the cooling water stream in response to detecting changes in thermal efficiency.

In some examples, controller 136 establishes a heat transfer efficiency trend for heat exchanger 104 over a period of time. The period of time over which the heat transfer efficiency trend is established may begin when the heat exchanger is first placed in service (e.g., is new or following cleaning). This is when heat exchanger 104 is least likely to be fouled. Alternatively, the period of time over which the heat transfer efficiency trend is established may begin after the heat exchanger has been placed in service for a period of time. For example, the heat transfer efficiency trend may be begin when changes are made to the cooling water stream (e.g., following blow down) and/or changes are made to the process stream (e.g., change in temperature, pressure, composition) flowing through heat exchanger 104.

Independent of when the period of time for measuring the heat transfer efficiency trend for heat exchanger 104 begins, controller 136 may measure the heat transfer efficiency for a period of time effective to provide a statistically reasonable trend of the heat transfer efficiency behavior. For example, controller 136 may measure the heat transfer efficiency of heat exchanger 104 for at least 5 days, such as at least 10 days, at least 20 days, or at least 30 days. In some examples, controller 136 measures the heat transfer efficiency of heat exchanger 104 for a period of time ranging from 5 days to 100 days, such as from 10 days to 45 days. In some examples, controller 136 measures the heat transfer efficiency as a rolling average over a certain number of preceding days, such as a proceeding period ranging from 5 days to 50 days.

Controller 136 can generate heat transfer efficiency values based on sensor information received during the period of measurement. Controller 136 can further perform statistical trend analysis on the heat transfer efficiency values determined during the period of measurement to identify a trend for the heat transfer efficiency of heat exchanger 104.

In some examples, controller 136 may fit a curve to heat transfer efficiency values plotted on a y-axis of a graph with corresponding measurement time plotted on the x-axis of the graph. In one example, the curve is a single order equation (also referred to as a first order equation) having the form $y=m*x+b$, where y is the heat transfer efficiency, x is the time, m is the slope of the curve, and b is the intercept of the curve. The slope of the curve "m" can be stored in a memory associated with controller 136 as a trend corresponding to heat transfer efficiency of heat exchanger 104. In other examples, a higher order polynomial curve may be fit to the data.

In some examples, controller 136 processes the temperature data received from sensors 126, 128, 130, and 132 and/or flow data received from sensor 134 prior to calculating the heat transfer efficiency. For example, controller 136 may smooth the data using a statistical smoothing algorithm to remove noise and outliers from the data. Controller 136 may then determine the heat transfer efficiency using smoothed temperature values. Alternatively, controller 136 may calculate heat transfer efficiency values for the raw data and apply the smoothing algorithm to the calculated heat transfer efficiency values. Subsequent trend analysis and change detection may be performed using the smoothed data.

Controller 136 can continue receiving measurements from the sensors in system 100 and generating heat transfer efficiency values based on the received sensor data after establishing a heat transfer efficiency trend. Controller 136 can compare heat transfer efficiency information for heat exchanger 104 to the heat transfer efficiency trend determined for the heat exchanger and detect if there is a change in the heat transfer efficiency trend. For example, controller 136 may determine a heat transfer efficiency trend for a measurement period and compare that trend to the earlier-established trend. The measurement period can be comparatively short (e.g., a day or less) or longer (e.g., a day or more, such as a week or more). In applications where controller 136 fits a single order equation to the heat transfer efficiency data calculated based on data received from heat exchanger 104, the controller may determine a slope of the heat transfer efficiency during the measurement period. Controller 136 may compare the slope of the heat transfer efficiency trend of heat exchanger 104 during the measurement period to slope of the earlier-established heat transfer efficiency trend.

Controller 136 may determine if the heat transfer efficiency trend during the measurement period differs from the earlier-established heat transfer efficiency trend by more than a threshold amount. The threshold amount may be greater than or equal to 1% of the earlier-established heat transfer efficiency value (e.g., slope), such as greater than or equal to 5% of the earlier-established heat transfer efficiency value, greater than or equal to 10% of the earlier-established heat transfer efficiency value, greater than or equal to 25% of the earlier-established heat transfer efficiency value, or greater than or equal to 50% of the earlier-established heat transfer efficiency value. For example, the threshold amount may range from 1 percent to 25 percent of the earlier-established heat transfer efficiency value, such as from 5 percent to 20 percent.

If the heat transfer efficiency trend is deviating from the earlier-established heat transfer efficiency trend, it may be indicative that the heat exchanger is fouling faster during the measurement period than during earlier operation. If left untreated, the more rapid fouling may reduce the operating efficiency of heat exchanger 104, potentially necessitating costly and unplanned shutdown to clean the exchanger before the next scheduled cleaning.

To help proactively respond to the detected change in heat transfer efficiency trend, controller 136 can control pump 106 to control the addition of chemical additive to the cooling water in response to the detected change in heat transfer efficiency trend. Processor 138 of controller 136 may compare the change in heat transfer efficiency trend to one or more thresholds stored in memory 140 relating different efficiency trend changes to different additive control schemes. In some examples, controller 136 starts and/or stops pump 106 or increases and/or decreases the rate of pump 106 to adjust the concentration of a chemical additive in the cooling water. Starting pump 106 or increasing the operating rate of pump 106 can increase the concentration of the chemical additive in the cooling water. This may be useful if the detected change indicates that the heat transfer efficiency trend has deviated negative, meaning heat exchanger 104 is fouling faster than earlier detected. Stopping pump 106 or decreasing the operating rate of pump 106 may decrease the concentration of chemical additive in the cooling water. This may be useful if the detected change indicates that the heat transfer efficiency trend has deviated positive, meaning heat exchanger 104 is fouling slower than earlier detected such that less additive can be used.

In applications where there are multiple different chemical additives available for introduction into the cooling water, controller 136 may select one or more of the different chemical additives to be introduced into the cooling water based on the detected change in heat transfer efficiency trend. Controller 136 may select one or more different chemical additives by controlling valve(s) and/or pump(s) fluidly coupling the one or more different chemical additives to the cooling water stream. For example, controller 136 may vary the type of chemical additive introduced into the cooling water and/or the rate at which the chemical additive is introduced into the cooling water based on the detected change in heat transfer efficiency trend and, optionally, also based on other sensor data, such as ORP, pH, and/or conductivity of the cooling water.

In some examples, controller 136 starts pump 106 or increasing the operating rate of pump 106 in response to detecting a change indicating that the heat transfer efficiency trend for heat exchanger 104 has decreased by more than a threshold amount compared to the earlier-established heat transfer efficiency trend. Controller 136 can continue receiving data from the sensors in system 100 and calculating a heat transfer efficiency for heat exchanger 104 after adjusting the chemical additive introduced into the cooling water. Controller 136 may monitor the heat transfer efficiency trend for heat exchanger 104 following changes made to the chemical additive (e.g., type and/or rate) in response to detecting a change to the heat transfer efficiency trend. Controller 136 may determine if the heat transfer efficiency trend stabilizes (e.g., remains substantially constant), returns toward the previously-established trend, or deviates further from the previously-established trend. Controller 136 may control system 100 to further modify the type and/or rate of chemical additive introduced into the cooling water based on the continue monitoring of the heat transfer efficiency. For example, controller 136 may increase the amount of chemical additive in the cooling water (e.g., by starting or increasing the rate of pump 106), at least until the heat transfer efficiency trend for heat exchanger 104 exhibits an inflection point. The inflection point may correspond to a change from a downward trend for the heat transfer efficiency (e.g., indicating that the rate of fouling is increasing) to an upward trend (e.g., indicating that rate of fouling is decreasing).

Controller 136 may take a variety of different control actions within system 100 in addition to or in lieu of controlling pump 106 to change a type or concentration of chemical additive in the cooling water. As one example, controller 136 may increase the rate at which cooling water flows through heat exchanger 104 in response to detecting a change in the heat transfer efficiency trend for the heat exchanger. For example, if controller 136 detects a sudden change in the absolute magnitude of the heat transfer efficiency of heat exchanger 104 and/or a significant decrease in the heat transfer efficiency trend (e.g., indicating rapid fouling), that may be indicative of heat exchanger plugging due to silt, debris, or other large particulate matter. Accordingly, increasing the flow rate of cooling water passing through the exchanger may help flush particulate matter lodged within the heat exchanger. Controller 136 may control a pump (not illustrated) supplying cooling water from a sump associated with cooling tower 102 to heat exchanger 104 to control the flow rate of cooling water supply to the heat exchanger.

A cooling water monitoring and control system according to the disclosure can be implemented in any process where a thermal exchange fluid is used to transfer thermal energy with one or more process streams through a heat exchanger. Example process streams that may flow through the hot side of heat exchanger 104 include, but are not limited to, crude oil, derivatives of crude oil (e.g., refined or partially refined crude oil products), and intermediary or final products in an ammonia production process. The process streams flowing through the hot side of heat exchanger 104 may generally be liquid phase, although may be vapor phase, and/or a liquid-vapor multi-phase stream.

Figure 2:
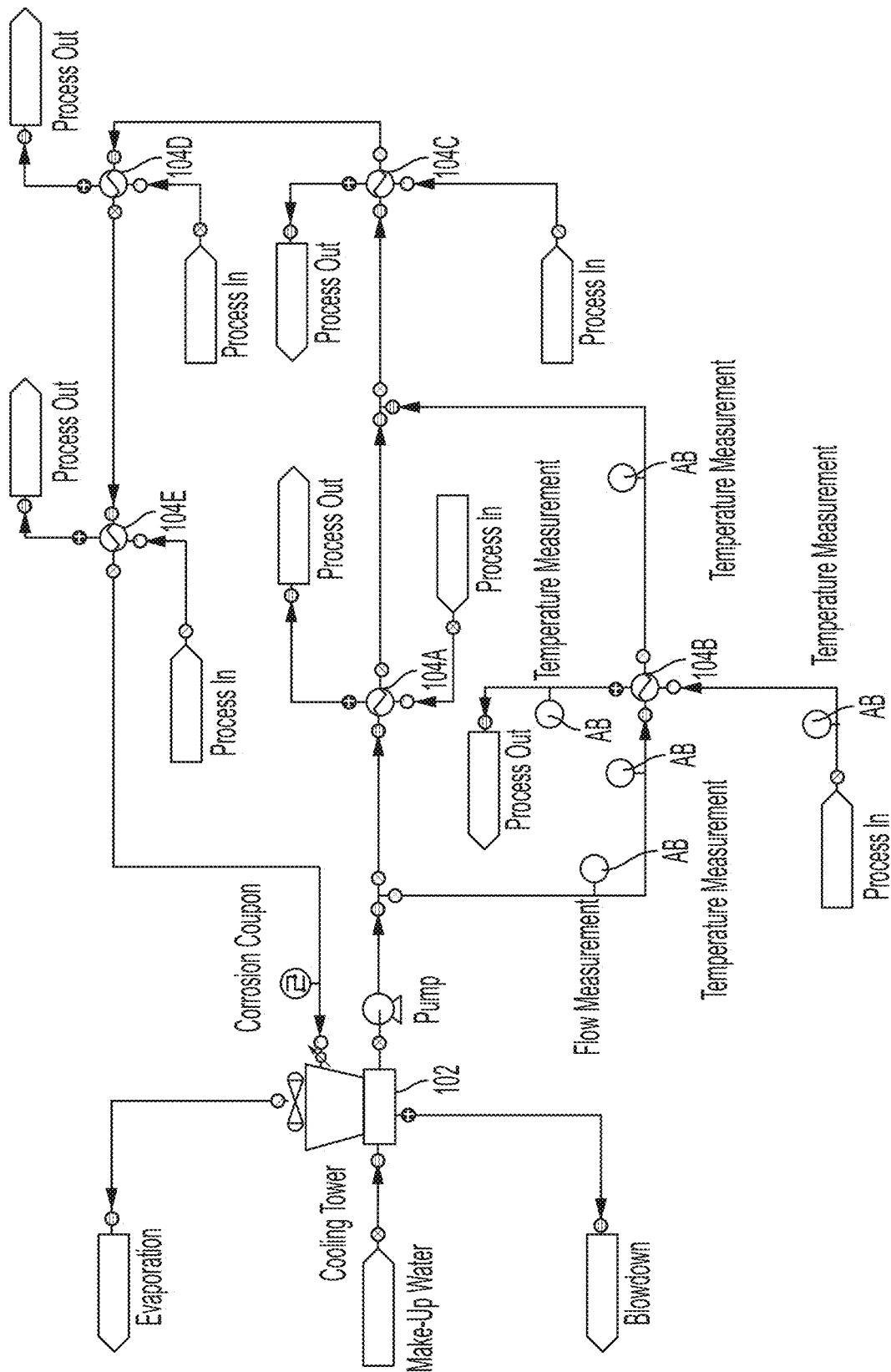
FIG. 2 is a flow diagram illustrating an example heat exchanger network containing multiple heat exchangers in which a cooling water monitoring and control system according to FIG. 1 may be implemented.

As briefly mentioned above, although FIG. 1 illustrates an example monitoring and control system containing only a single heat exchanger, example applications may include multiple heat exchangers in series and/or in parallel. FIG. 2 is a flow diagram illustrating an example heat exchanger network containing multiple heat exchangers in which a cooling water monitoring and control system according to the disclosure may be implemented. As shown in this example, multiple heat exchangers 104A-104D are fluidly connected to a cooling water stream supplied by cooling tower 102. Cooling water flows in parallel through heat exchangers 104A and 104B followed, in series, through heat exchangers 104C-104E before returning to the cooling tower.

In applications where there are multiple heat exchangers in a network, one or multiple of the heat exchangers (and, optionally, all of the heat exchangers) may include sensors as described in connection with heat exchanger 104 in FIG. 1. Controller 136 can receive data from the sensors and determine a heat transfer efficiency trend for each of the connected heat exchangers. Controller 136 can detect a change in the heat transfer efficiency trend of at least one, and optionally multiple, of the heat exchangers being monitored and control addition of the chemical additive to the cooling water stream based on the detected trend. For example, controller 136 may control pump 106 to change the type and/or amount of chemical additive introduced into the cooling water stream upon detecting a change in the heat transfer efficiency trend (e.g., exceeding a threshold amount) of a single heat exchanger. Alternatively, controller 136 may control pump 106 to change the type and/or amount of chemical additive introduced into the cooling water stream upon detecting a change in the heat transfer efficiency trend (e.g., exceeding a threshold amount) of multiple of the heat exchangers. In this latter example, the detection of changed heat transfer efficiency trends for multiple heat exchangers may indicate the fouling conditions are actually changing as opposed to receiving errant sensor data from one particular heat exchanger.

Figure 3:
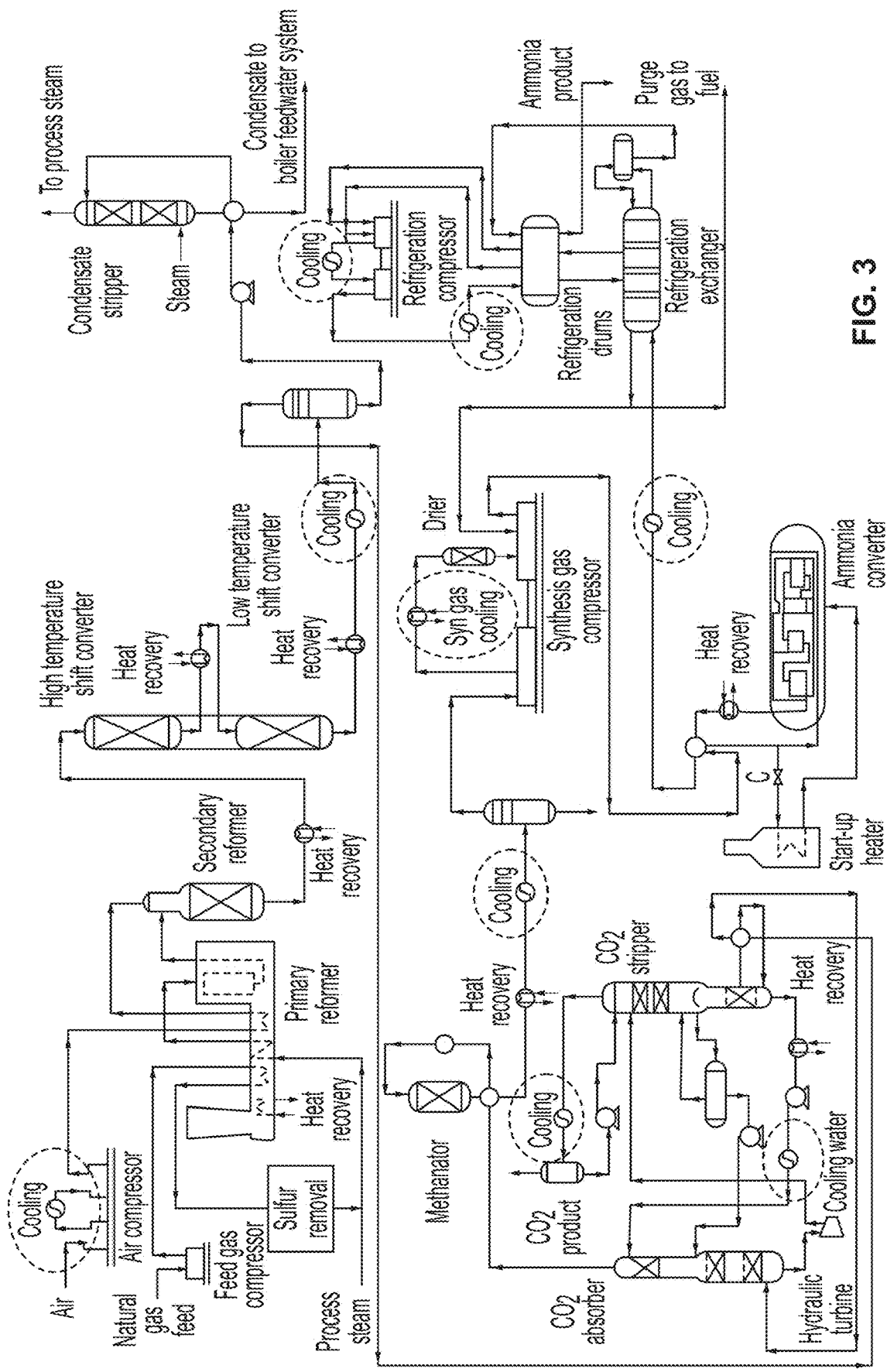
FIG. 3 is a flow diagram illustrating an example ammonia production process in which a cooling water monitoring and control system according to FIG. 1 may be implemented.

FIG. 3 is a flow diagram illustrating an example ammonia production process. As shown in the illustrated example, the example process includes multiple cooling heat exchangers through which cooling water may be conveyed. One or more (e.g., all) of these example heat exchangers may be monitored using the techniques and systems described herein, and chemical additive to the cooling water stream controlled based on the heat exchanger efficiency trends.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following examples may provide additional details about cooling water monitoring and control systems and techniques according to the disclosure.

EXAMPLES

Example 1

Ammonia Plant

Temperature sensors were installed on a heat exchanger in an ammonia plant to measure the inlet and outlet temperatures of the flow streams to the heat exchanger as well as the flow rate of cooling water through the inlet of the heat exchanger. The heat exchanger was a syngas cooler that passed syngas through the hot or process side of the heat exchanger while cooling water flowed through the cold side of the heat exchanger. The heat exchanger was a counter-current shell-and-tube exchanger. The syngas was supplied to the shell side of the heat exchanger at a target flow rate of approximately 99,000 lb/hr, while the cooling water was supplied at a target flow rate of approximately 1,000,000 lb/hr.

The cooling water was supplied from a cooling tower that had a recirculation rate of approximately 80,000 gallons/minute. The cooling tower had a capacity of approximately 500,000 gallons and exhibited a temperature differential of 12 degrees Fahrenheit. The cooling water exhibited a FRC of 0.5 ppm as $Cl_2$. The cooling water was initially controlled with a combination of three chemical additives: a corrosion inhibitor (Nalco® 3DT129) provided at a concentration of 35 ppm, a scale inhibitor (Nalco® 3DT191) provided at a concentration of 75 ppm, and a yellow metal inhibitor (Nalco® 3DT199) provided at a concentration of 10 ppm.

Figure 4:
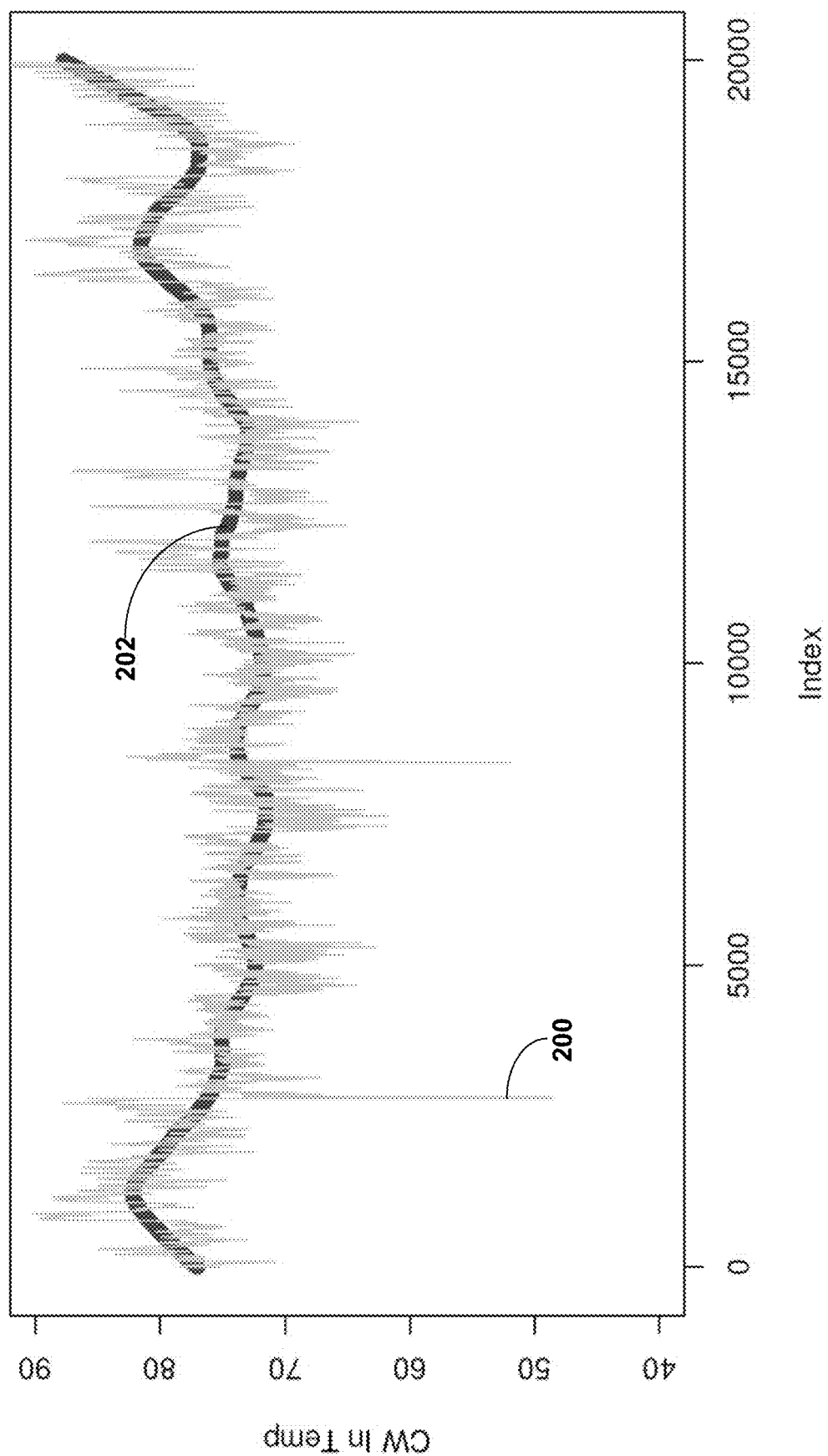
FIGS. 4-7 show example raw and smoothed temperature data for flow streams on a heat exchanger.
Figure 5:
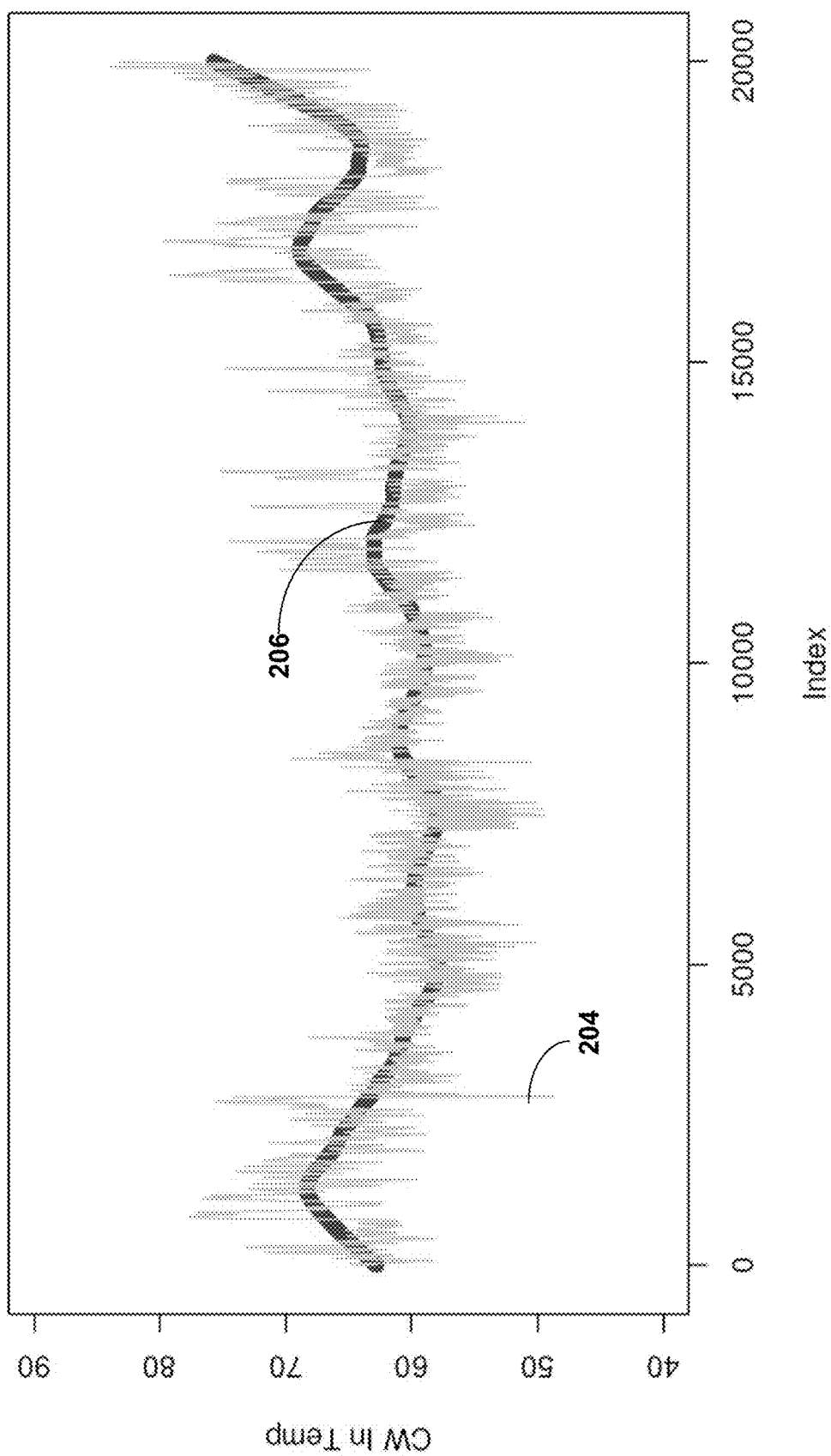
Figure 6:
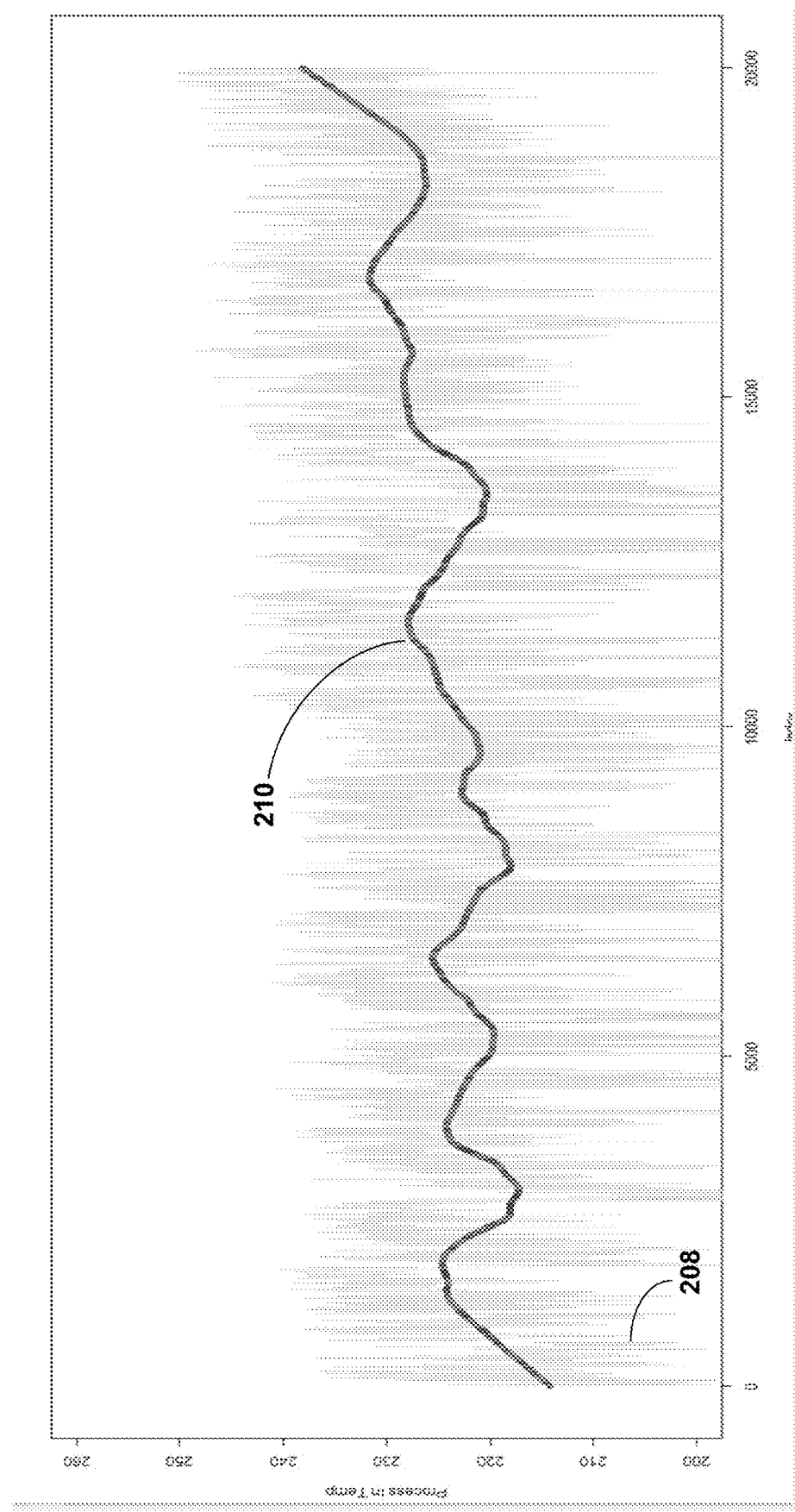
Figure 7:
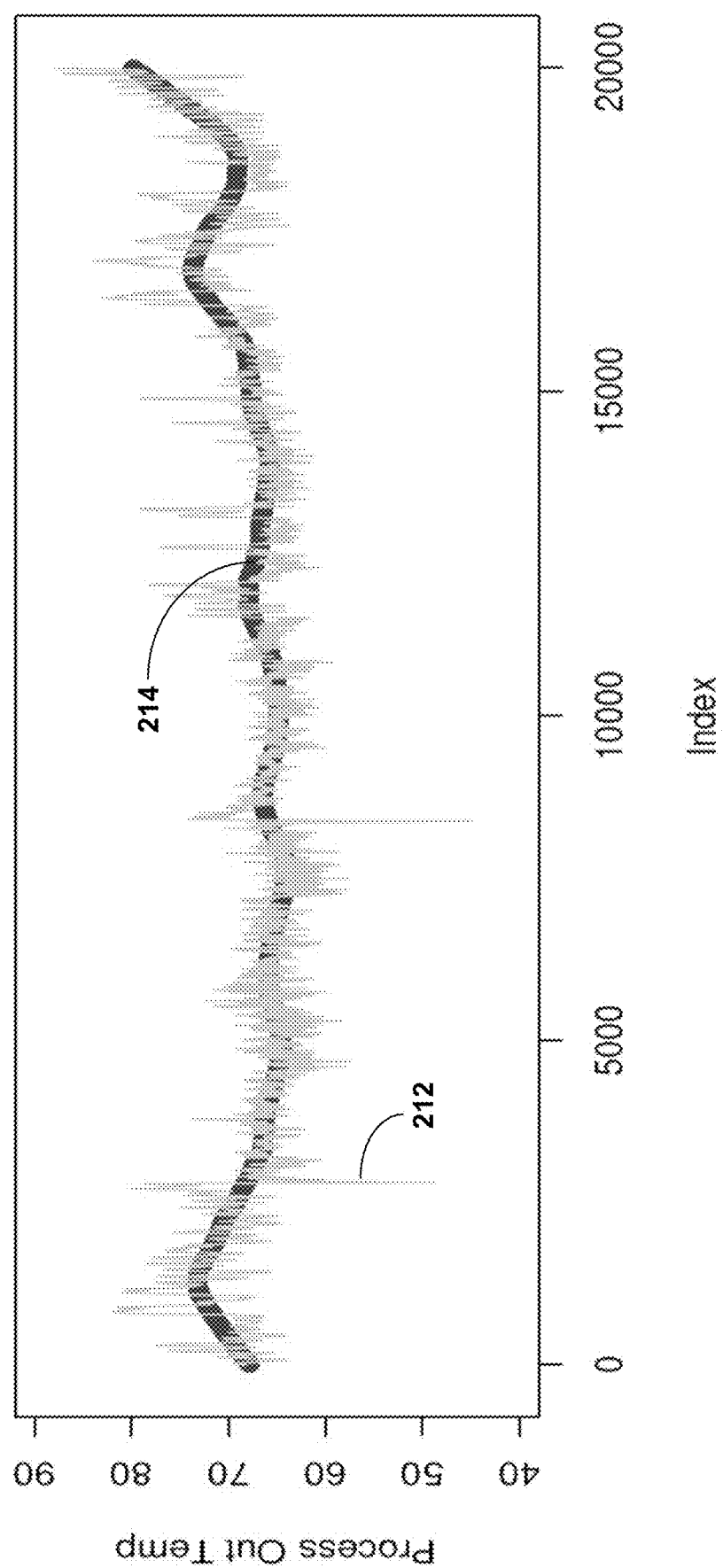
Figure 8:
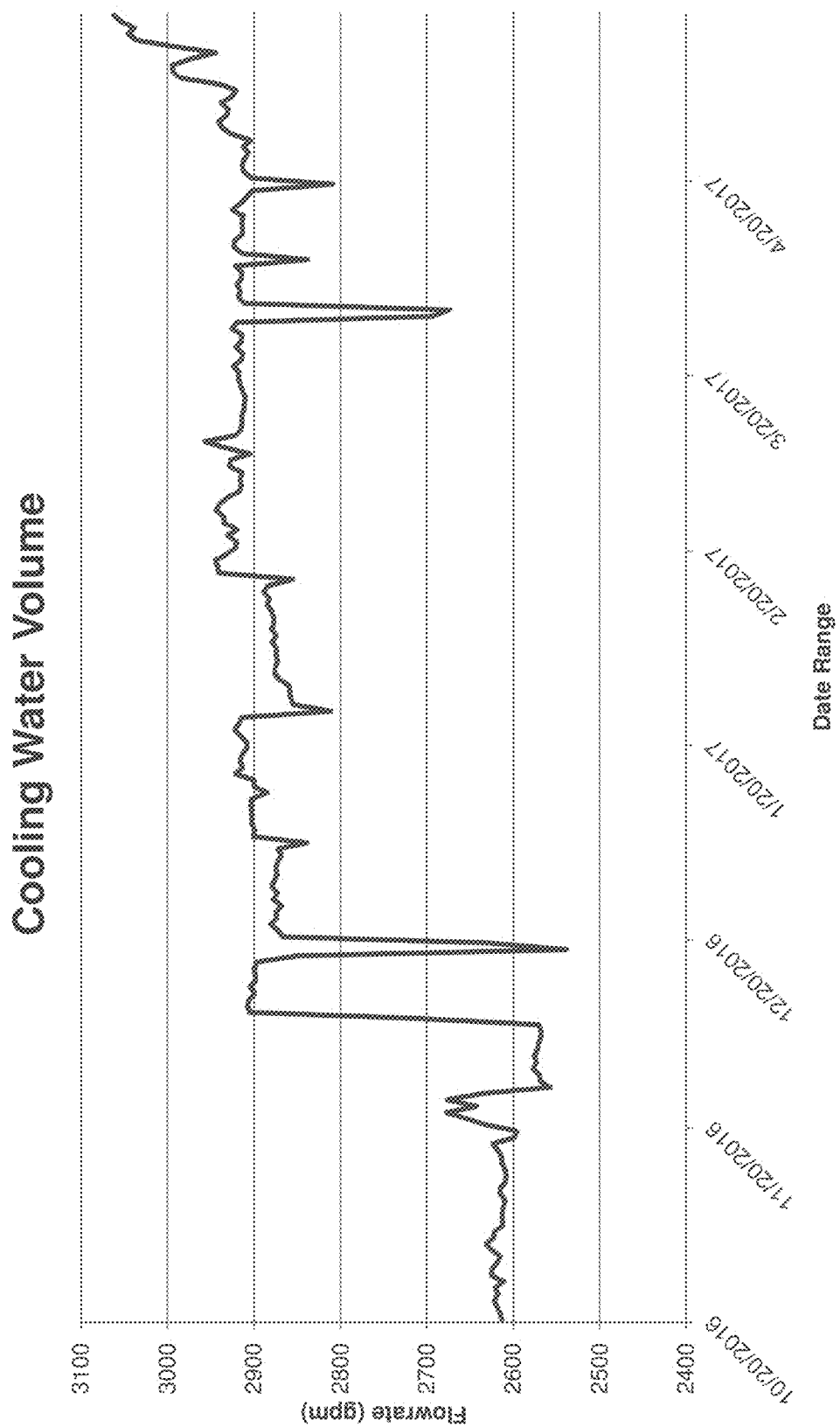
FIG. 8 shows example cooling water flow rate data for the heat exchanger providing temperature data illustrated in FIGS. 4-7.

Temperature data from the heat exchanger were smoothed using local regression with a span of 0.1. FIG. 4 is a graph of the cooling water inlet temperature (degrees Fahrenheit) versus time showing the raw measurement data 200 along with smoothed data 202 overlaid. FIG. 5 is a graph of the cooling water outlet temperature (degrees Fahrenheit) versus time showing the raw measurement data 204 along with smoothed data 206 overlaid. FIG. 6 is a graph of the process stream inlet temperature (degrees Fahrenheit) versus time showing the raw measurement data 208 along with smoothed data 210 overlaid. FIG. 7 is a graph of the process stream outlet temperature (degrees Fahrenheit) versus time showing the raw measurement data 212 along with smoothed data 214 overlaid. FIG. 8 is a graph showing cooling water flow rates (gallons per minute) for an example period of time.

Figure 9:
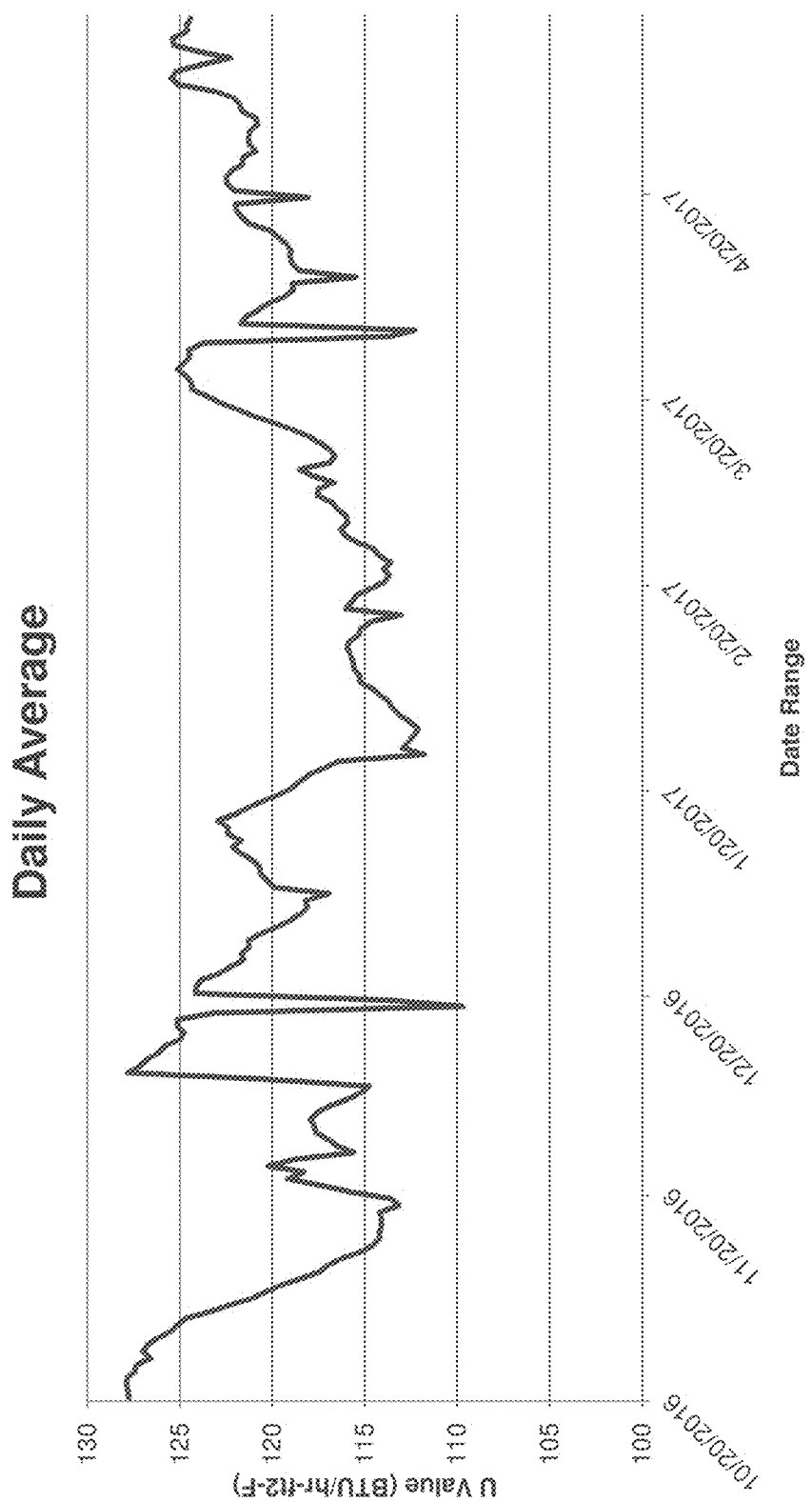
FIG. 9 is a graph showing example heat transfer coefficients calculated using the smoothed temperature data and flow rate data from FIGS. 4-8.

Heat transfer efficiency values and trends were calculated using the smoothed temperature data produced from the temperature sensors installed on the heat exchanger. The heat transfer efficiency trends were used to control the cooling water system, including the chemical additives introduced into the cooling water. FIG. 9 is a graph showing heat transfer coefficients calculated using the smoothed temperature data over the example period of time. The sharp valleys in these data correspond to when water flowrate was decreased.

Figure 10:
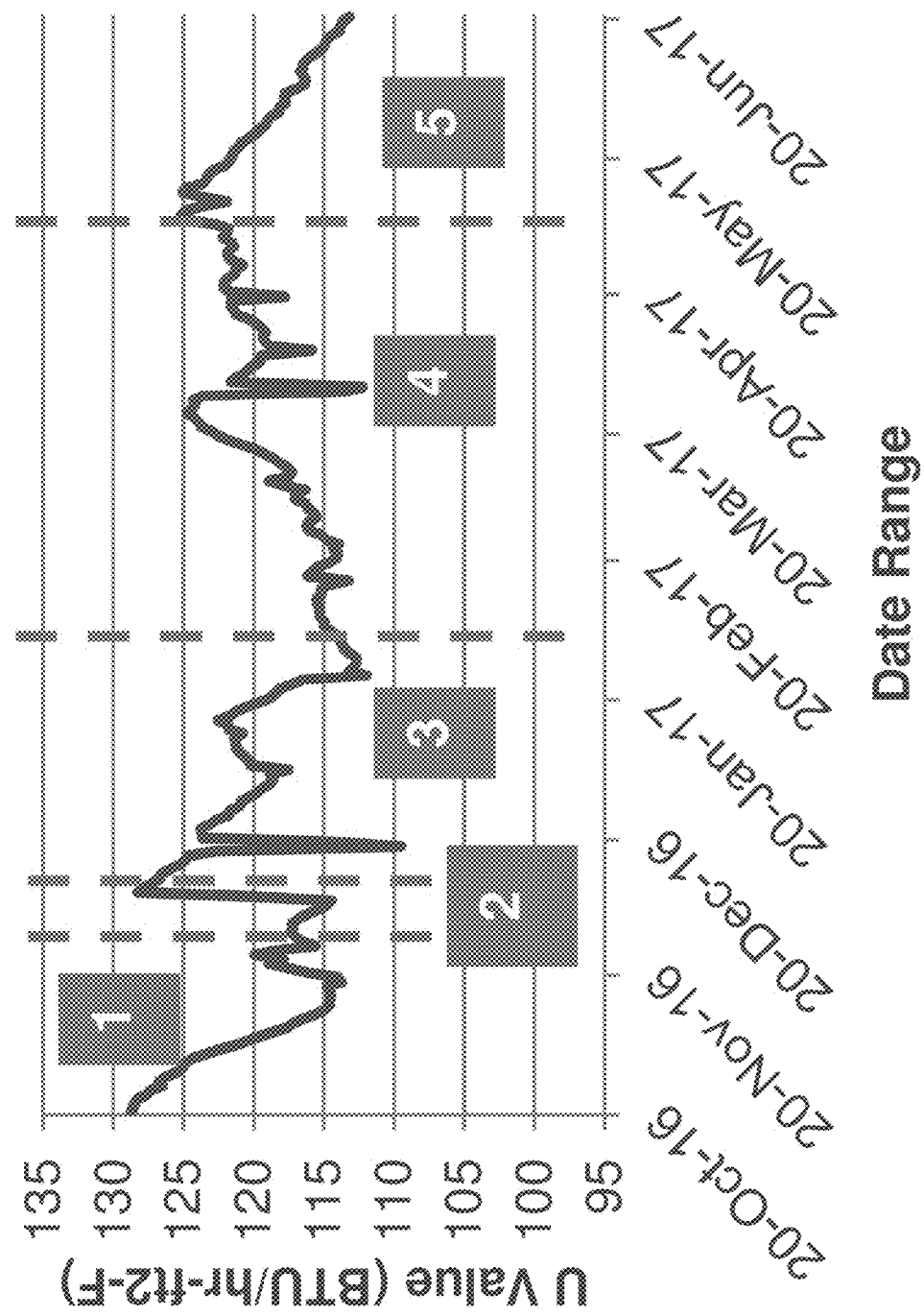
FIG. 10 is a graph showing example heat transfer coefficients calculated using the smoothed temperature data and flow rate data from FIGS. 4-8 overlaid with periodicity markers.
Figure 11:
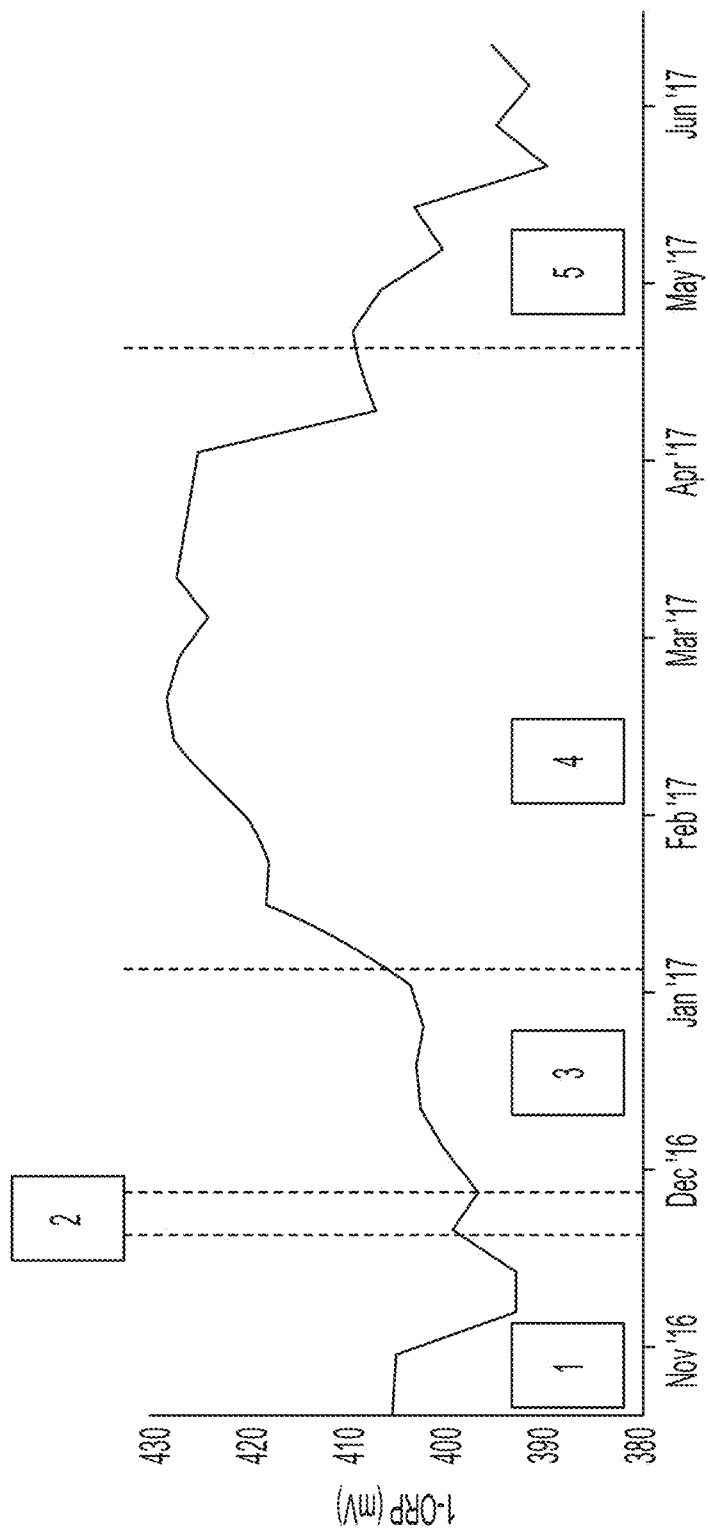
FIG. 11 shows example oxidation-reduction potential (ORP) values for the cooling water stream corresponding to the flow rate data in FIG. 8.

FIG. 10 shows heat transfer coefficients calculated for the heat exchanger based on received temperature and flow rate data over an example range of dates. FIG. 11 shows the oxidation-reduction potential (ORP) for the cooling water stream over the same example range of dates, which is indicative of the concentration of chemical additive in the cooling water. The data in FIGS. 10 and 11 are sectionalized into five periods of experimental analysis. In the first period, data establishing a heat transfer efficiency trend were established. The data showed a downward trend in heat transfer efficiency. In the second period, the cooling water flow rate was increased, resulting in an increase in the heat transfer coefficient for the heat exchanger proportional to the change in flow rate. In the third period, the trend of the heat transfer efficiency was monitored and observed to decrease.

A changing trend in the heat transfer coefficient, particularly toward the end of the third period, indicated accelerating fouling conditions. Accordingly, interventional action was initiated. The cooling water was evaluated and microbial biofoulants suggested as the cause of the fouling. In phase 4, biocide dosage was increased to the cooling water, resulting in an increase in the heat transfer coefficient. To understand if this heat transfer improvement was in response to biocide dosage increase initiated upon detecting the changing trend in the heat transfer coefficient or some other factor, the biocide dosage was decreased in phase 5. The data show that the heat transfer coefficient again decreased.

Example 2

Vinyl Plant

Temperature sensors were installed on a heat exchanger in a vinyl plant to measure the inlet and outlet temperatures of the flow streams to the heat exchanger as well as the flow rate of cooling water through the inlet of the heat exchanger. The heat exchanger had a propylene stream passing through the hot or process side of the heat exchanger while cooling water flowed through the cold side of the heat exchanger. The heat exchanger was a counter-current shell-and-tube exchanger. The propylene was supplied to the shell side of the heat exchanger at a target flow rate of approximately 270,000 lb/hr, while the cooling water was supplied at a target flow rate of approximately 4,600,000 lb/hr.

The cooling water was supplied from a cooling tower that had a recirculation rate of approximately 85,000 gallons/minute. The cooling tower had a capacity of approximately 1,000,000 gallons and exhibited a temperature differential of 10 degrees Fahrenheit. The cooling water exhibited a FRC of 0.5 ppm as $Cl_2$. The cooling water was initially controlled with a combination of three chemical additives: a corrosion inhibitor (Nalco® 3DT177) provided at a concentration of 37 ppm, a scale inhibitor (Nalco® 3DT390) provided at a concentration of 28 ppm, and a yellow metal inhibitor (Nalco® 3DT197) provided at a concentration of 10 ppm.

Figure 12:
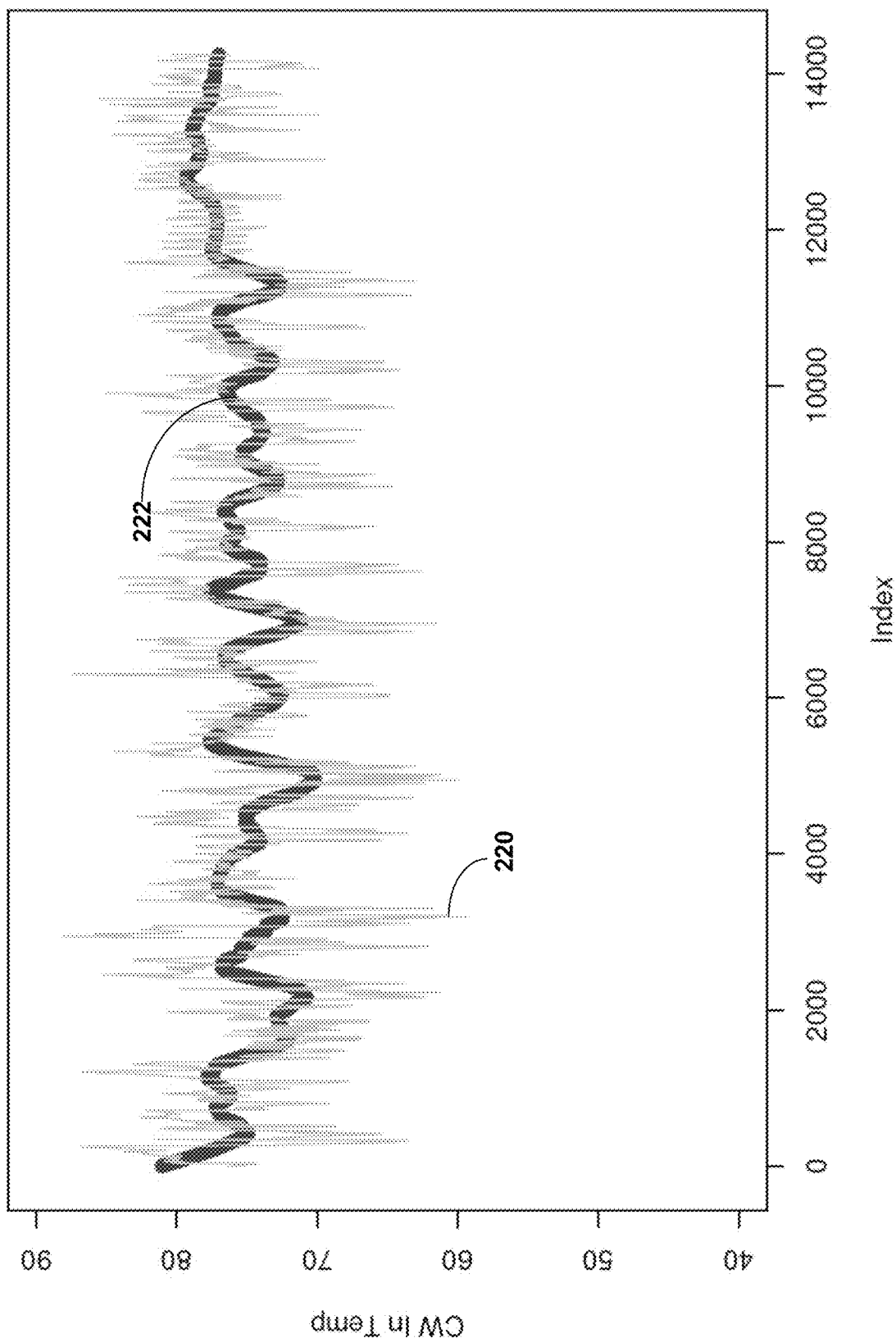
FIGS. 12-15 show example raw and smoothed temperature data for flow streams on another example heat exchanger.
Figure 13:
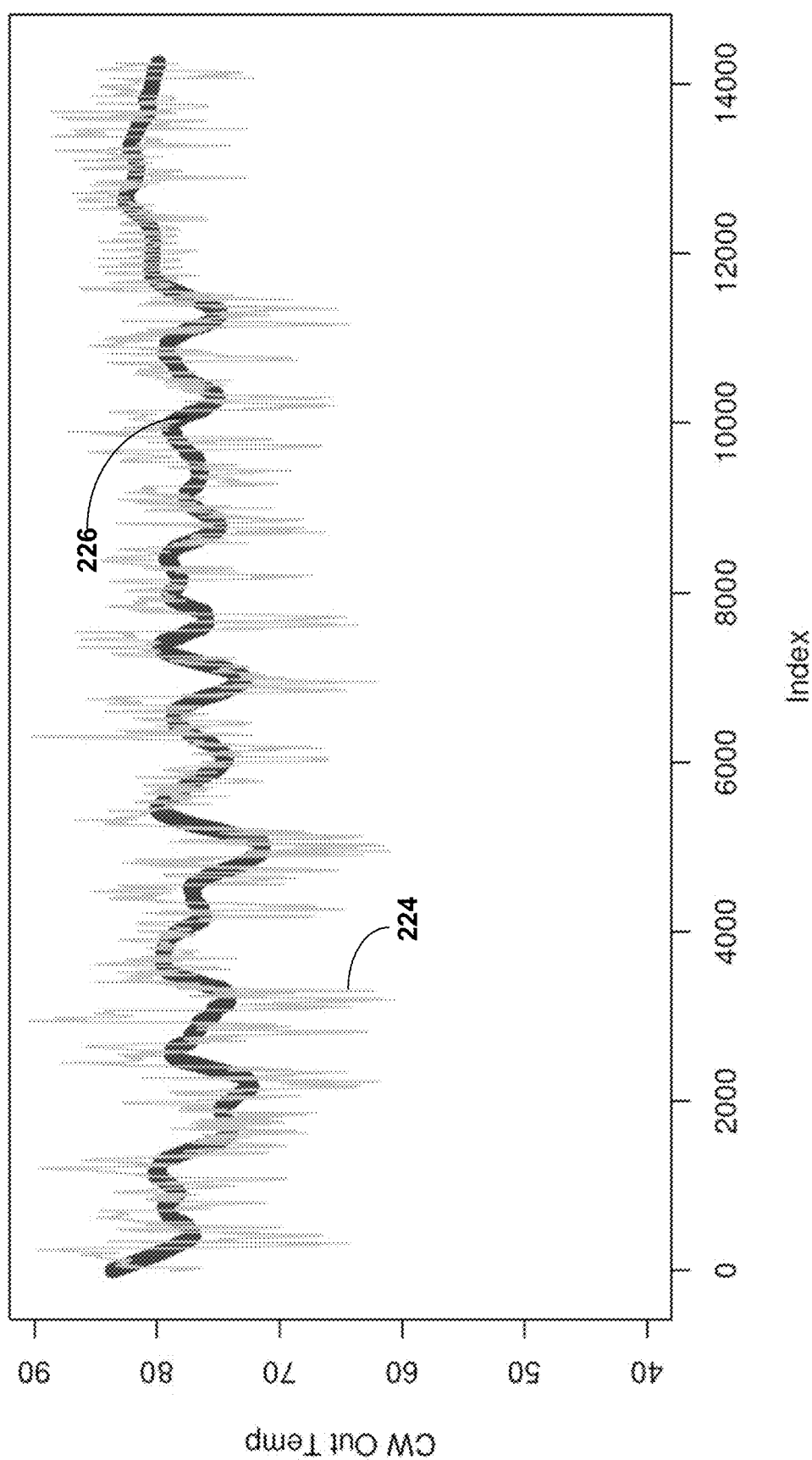
Figure 14:
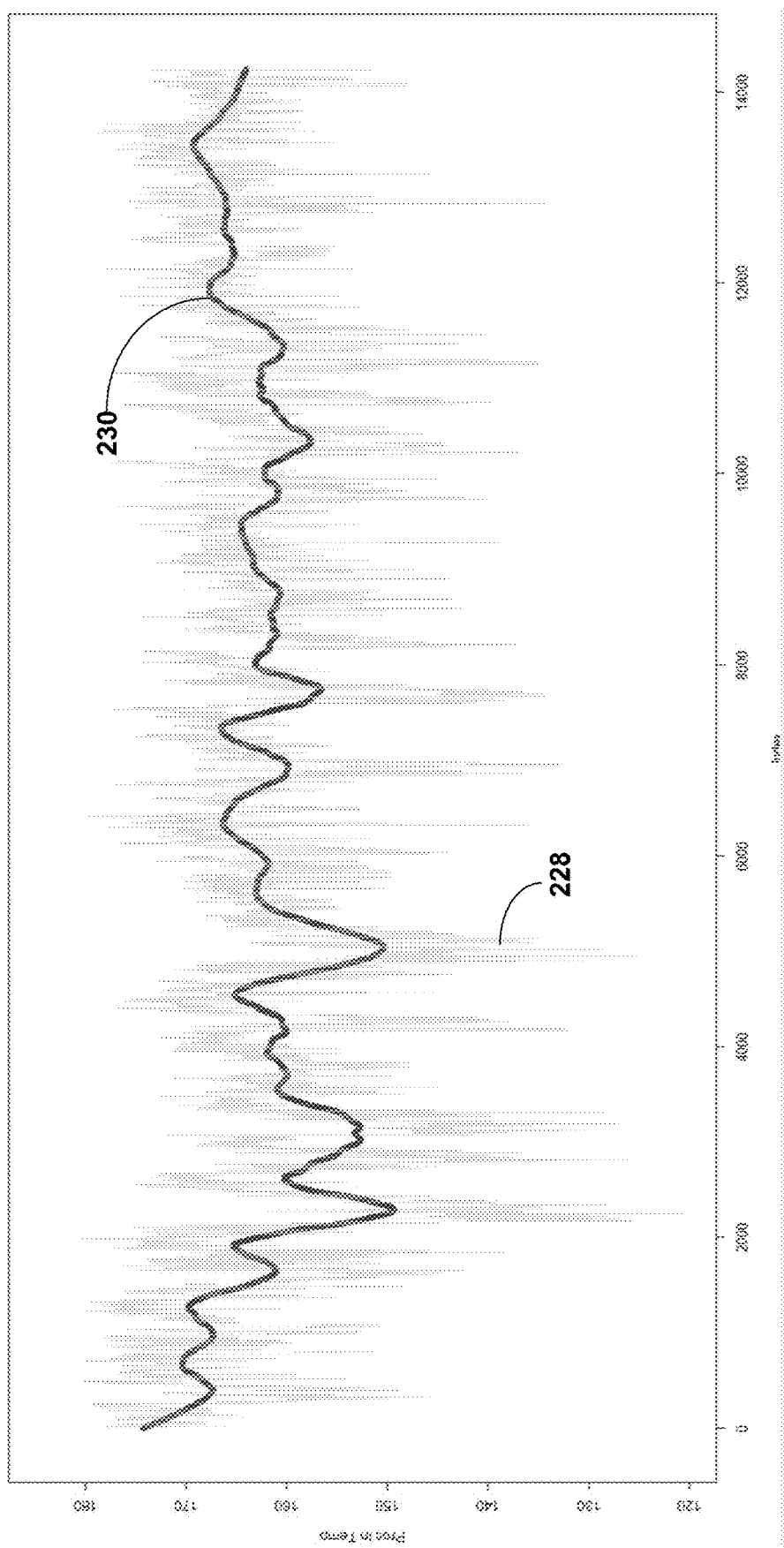
Figure 15:
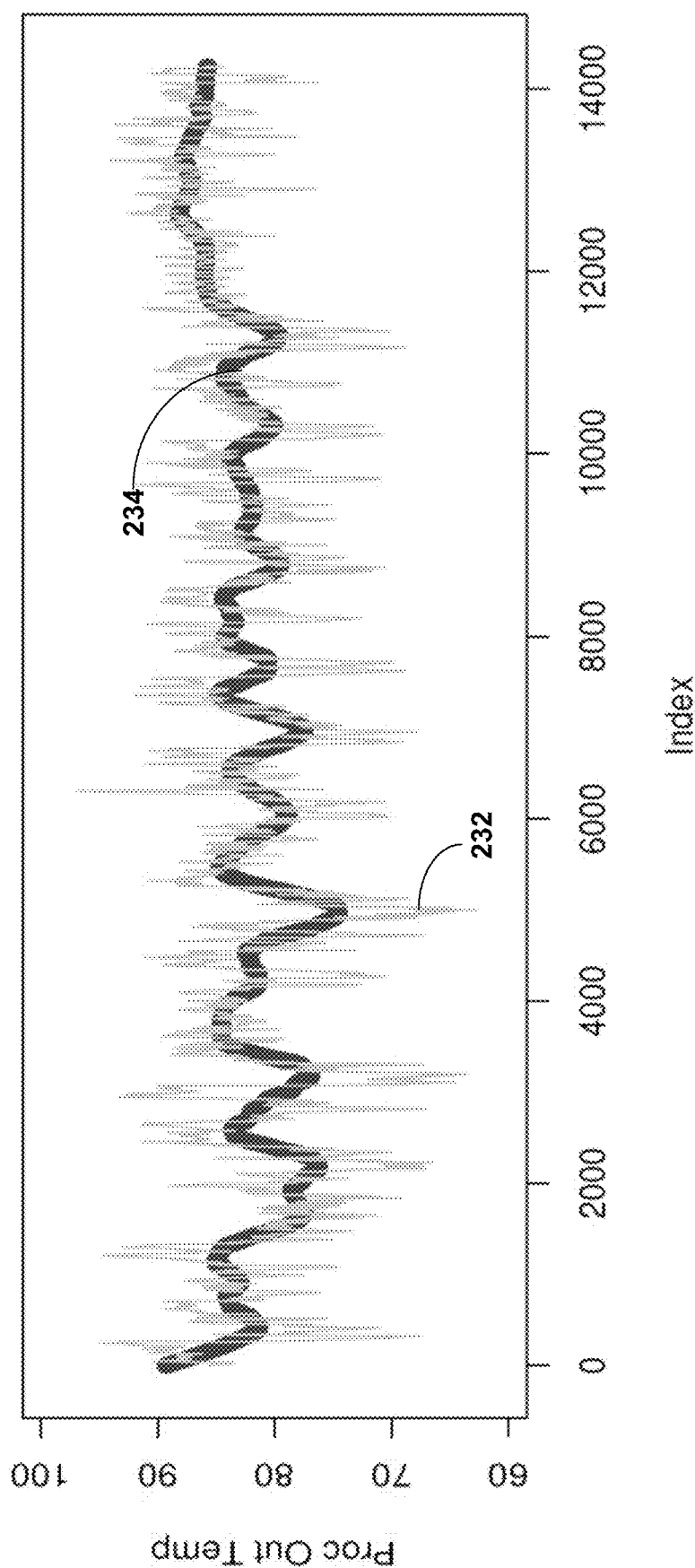
Figure 16:
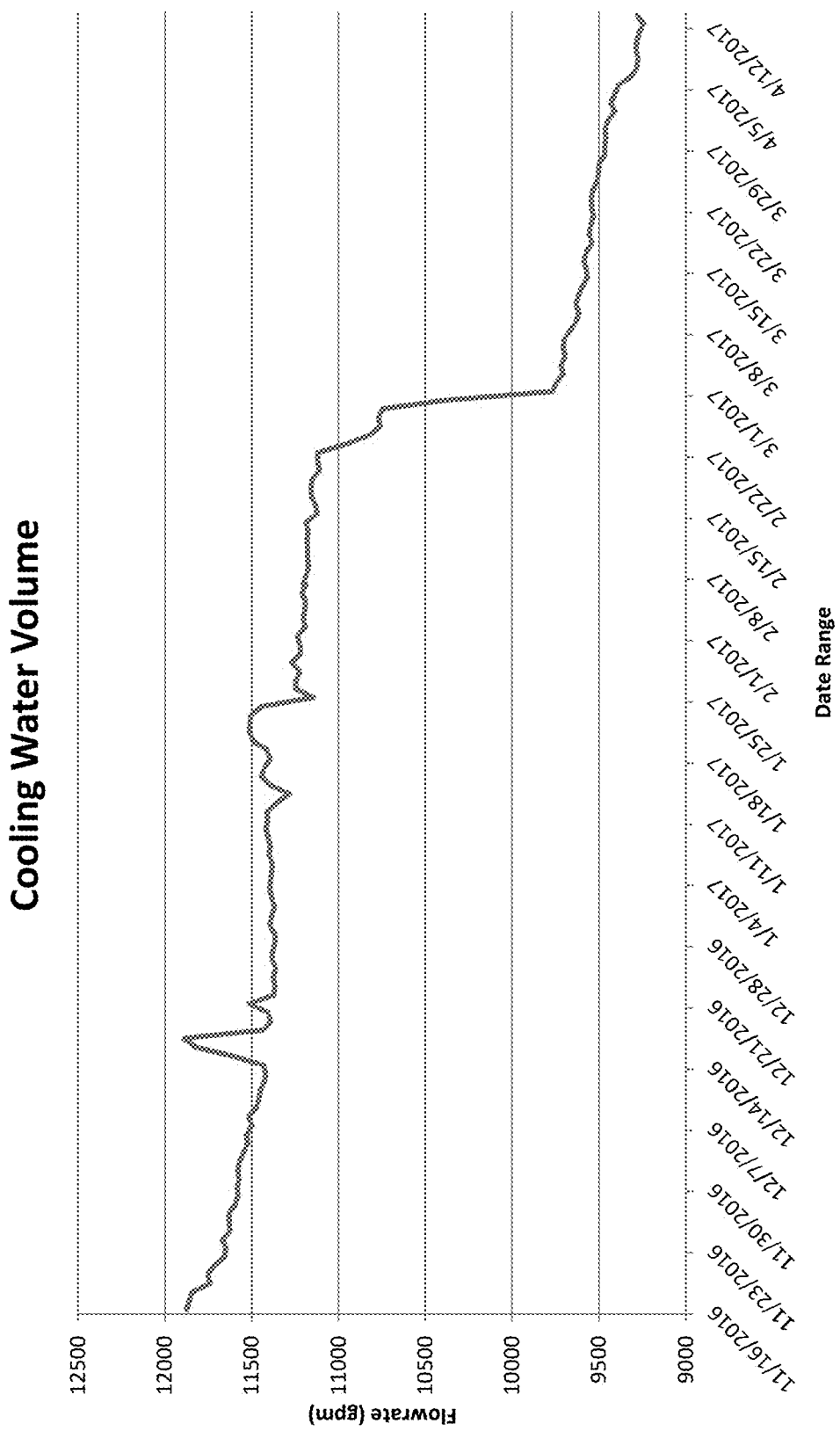
FIG. 16 shows example cooling water flow rate data for the heat exchanger providing temperature data illustrated in FIGS. 12-15.

Temperature data from the heat exchanger were smoothed using local regression with a span of 0.05. FIG. 12 is a graph of the cooling water inlet temperature (degrees Fahrenheit) versus time showing the raw measurement data 220 along with smoothed data 222 overlaid. FIG. 13 is a graph of the cooling water outlet temperature (degrees Fahrenheit) versus time showing the raw measurement data 224 along with smoothed data 226 overlaid. FIG. 14 is a graph of the process stream inlet temperature (degrees Fahrenheit) versus time showing the raw measurement data 228 along with smoothed data 230 overlaid. FIG. 15 is a graph of the process stream outlet temperature (degrees Fahrenheit) versus time showing the raw measurement data 232 along with smoothed data 234 overlaid. FIG. 16 is a graph showing cooling water flow rates (gallons per minute) for an example period of time. The step change in water flow rate was caused by an intentional decrease in the water flow.

Figure 17:
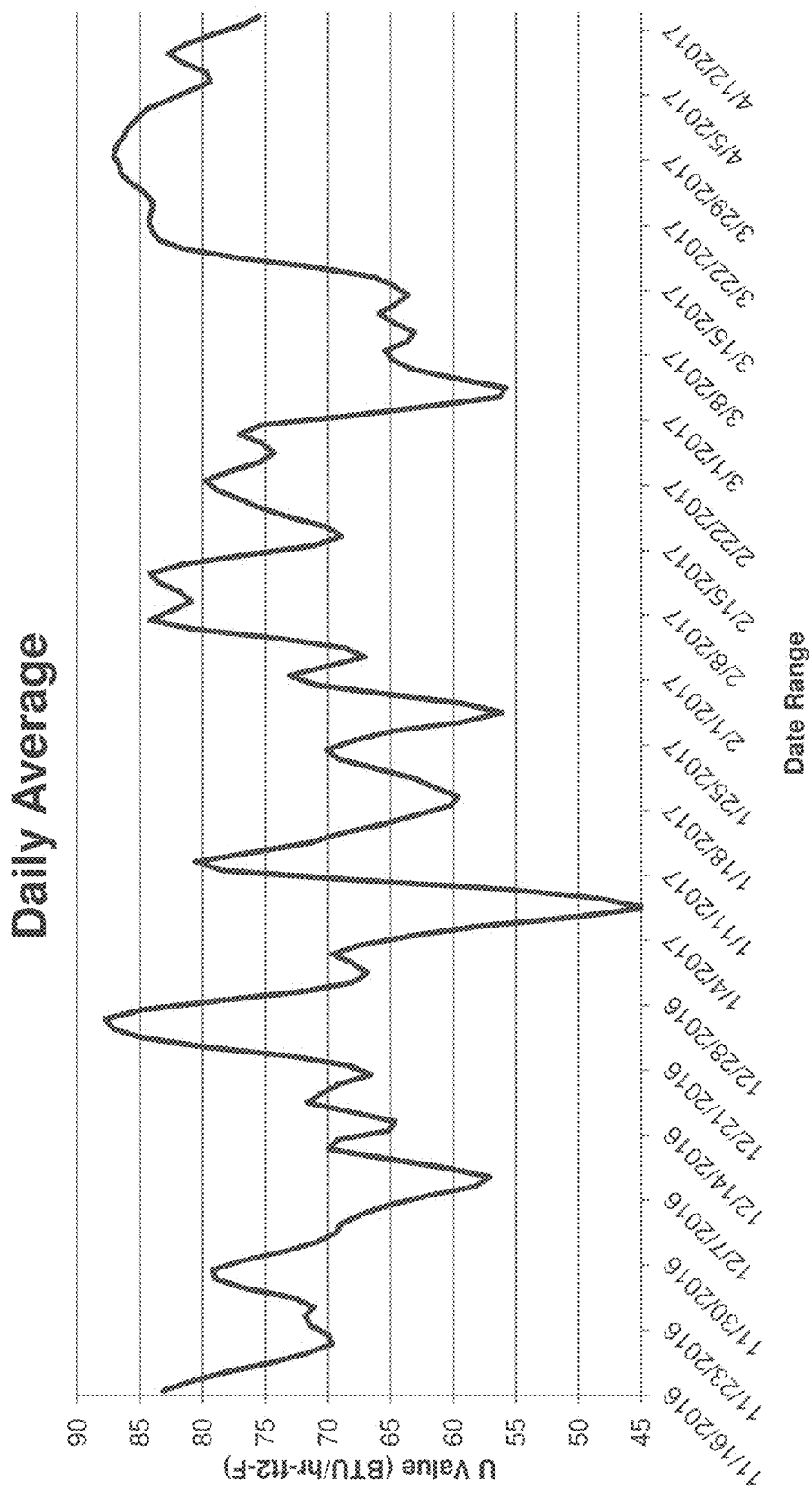
FIG. 17 is a graph showing example heat transfer coefficients calculated using the smoothed temperature data and flow rate data from FIGS. 12-16.

Heat transfer efficiency values and trends were calculated using the smoothed temperature data produced from the temperature sensors installed on the heat exchanger. The heat transfer efficiency trends were used to control the cooling water system, including the chemical additives introduced into the cooling water. FIG. 17 is a graph showing heat transfer coefficients calculated using the smoothed temperature data over the example period of time.

In this example, the heat transfer coefficient trend during the period of measurement was substantially flat. However, cooling water flow rates were observed to progressively decrease during the period of monitoring. This combination of behavior suggested debris/silting in the heat exchanger which would not be effectively addressed through chemistry addition alone. Rather, flushing of the heat exchanger and/or exchanger clean out may be needed to remove the accumulated debris/silting. This conclusion from the data was confirmed during a plant outage when the heat exchanger was opened and visually inspected.

The invention claimed is:

1. A method of controlling cooling water treatment comprising:
receiving data from a plurality of sensors indicative of at least a temperature of a cooling water stream entering a heat exchanger, a temperature of the cooling water stream exiting the heat exchanger, a temperature of a process stream entering the heat exchanger, and a temperature of the process stream exiting the heat exchanger;
determining a heat transfer efficiency for the heat exchanger based on the received data from the plurality of sensors;
establishing a heat transfer efficiency trend for the heat exchanger over a period of time, wherein establishing the heat transfer efficiency trend comprises fitting a curve having a slope to the heat transfer efficiency determined for the heat exchanger over the period of time;
determining the heat transfer efficiency trend for the heat exchanger over a measurement period occurring after the period of time, wherein determining the heat transfer efficiency trend for the heat exchanger over the measurement period comprises fitting the curve having the slope to the heat transfer efficiency determined for the heat exchanger over the measurement period;
detecting a change in the heat transfer efficiency trend between the period of time and the measurement period by at least determining a change in the slope of the heat transfer efficiency trend over the measurement period to the slope of the heat transfer efficiency trend over the period of time equal to or greater than a threshold amount; and
controlling addition of a chemical additive into the cooling water stream in response to the change detected in the heat transfer efficiency trend for the heat exchanger.

2. The method of claim 1, wherein the curve is a single order curve.

3. The method of claim 1, wherein the threshold amount ranges from 5 percent to 20 percent of the slope of the heat transfer efficiency trend over the period of time.

4. The method of claim 1, wherein establishing the heat transfer efficiency trend for the heat exchanger over the period of time comprises determining the heat transfer efficiency for the heat exchanger at least once per day over the period of time.

5. The method of claim 1, wherein determining the heat transfer efficiency for the heat exchanger comprises determining the heat transfer efficiency according to an equation:

$$U\text{-Value:} \frac{\dot{m}C_p \Delta T_{water}}{\Delta T_{LMTD} \times \text{Heat } Tr \cdot \text{Area} \times F_t}$$

wherein U-Value is the heat transfer efficiency, m is the mass of the cooling water stream per unit time, $C_p$ is the specific heat of the cooling water stream, $\Delta T_{water}$ is a difference between the temperature of the cooling water stream exiting the heat exchanger and the temperature of the cooling water stream entering a heat exchanger, Heat Tr. Area is an amount of surface area of the heat exchanger over which thermal energy is transferred between the process stream and the cooling water stream, $F_t$ is a correction factor corresponding to a geometry of the heat exchange and $\Delta T_{LMTD}$ is a log-mean temperature difference calculated using a following equation if the cooling water stream and the process stream flow in a counter-current direction:

$$\Delta T_{LMTD} = \frac{(T_{process,in} - t_{water,out}) - (T_{process,out} - t_{water,in})}{\log_e \frac{T_{process,in} - t_{water,out}}{T_{process,out} - t_{water,in}}}$$

or calculated using a following equation if the cooling water stream and the process stream flow in a co-current direction:

$$\Delta T_{LMTD} = \frac{(T_{process,in} - t_{water,in}) - (T_{process,out} - t_{water,out})}{\log_e \frac{T_{process,in} - t_{water,in}}{T_{process,out} - t_{water,out}}}$$

wherein $T_{Process,in}$ is the temperature of the process water stream entering the heat exchanger, $T_{Process, out}$ is the temperature of the process stream exiting the heat exchanger, $t_{water,in}$ is the temperature of the cooling water stream entering the heat exchanger, and $t_{water, out}$ is the temperature of the cooling water stream exiting the heat exchanger.

6. The method of claim 1, wherein the period of time ranges from 5 days to 100 days.

7. The method of claim 1, wherein the period of time begins upon the heat exchanger being placed in service following cleaning.

8. The method of claim 1, wherein the chemical additive is injected at a cooling tower upstream of an inlet of the heat exchanger that receives the cooling water stream entering the heat exchanger.

9. The method of claim 1, wherein controlling addition of the chemical additive comprises increasing a flow rate at which the chemical additive is introduced into the cooling water stream.

10. The method of claim 1, wherein controlling addition of the chemical additive comprises increasing a concentration of the chemical additive in the cooling water at least until the heat transfer efficiency trend exhibits an inflection from a downward trend to an upward trend.

11. The method of claim 1, further comprising increasing a flow rate of the cooling water in response to detecting the change in the heat transfer efficiency trend.

12. The method of claim 1, further comprising determining a type of foulant present in the cooling water and selecting the chemical additive based on the determined type of foulant.

13. The method of claim 1, further comprising smoothing the data corresponding to the temperature of the cooling water stream entering the heat exchanger, the temperature of the cooling water stream exiting the heat exchanger, the temperature of the process stream entering the heat exchanger, and the temperature of the process stream exiting the heat exchanger, wherein determining the heat transfer efficiency comprises determining the heat transfer efficiency using smoothed temperature values.

14. The method of claim 1, wherein the chemical additive is selected from the group consisting of a scale inhibitor, a corrosion inhibitor, a biocide, and combinations thereof.

15. The method of claim 1, wherein:
receiving data from the plurality of sensors comprises receiving data from the plurality of sensors for each of multiple heat exchangers that receive the cooling water stream,
determining the heat transfer efficiency comprises determining the heat transfer efficiency for each of the multiple heat exchangers;
establishing the heat transfer efficiency trend comprises establishing the heat transfer efficiency trend for each of the multiple heat exchangers; and
detecting the change in the heat transfer efficiency trend comprises detecting the change in the heat transfer efficiency trend for at least one of the multiple heat exchangers.

16. The method of claim 15, wherein:
detecting the change in the heat transfer efficiency trend comprises detecting the change in the heat transfer efficiency trend for each of the multiple heat exchanges, and
controlling addition of the chemical additive into the cooling water stream comprises controlling addition of the chemical additive into the cooling water stream in response to the change detected in the heat transfer efficiency trend for each of the multiple heat exchangers.

17. The method of claim 1, wherein the heat exchanger is selected from the group consisting of a shell and tube heat exchanger and a plate heat exchanger.

18. The method of claim 1, wherein the process stream comprises fouling material that deposits in the heat exchanger causing the heat transfer efficiency to decrease over the period of time, the cooling water stream comprises fouling material that deposits in the heat exchanger causing the heat transfer efficiency to decrease over the period of time, and the fouling material deposited by the process stream causes at least 75% of the decrease in the heat transfer efficiency over the period of time.

19. The method of claim 1, wherein the measurement period is less than the period of time.

* * * * *